(12) United States Patent
Gotoh et al.

(10) Patent No.: US 9,207,625 B2
(45) Date of Patent: Dec. 8, 2015

(54) LUBRICANT SUPPLY DEVICE, PROCESS UNIT, IMAGE FORMING APPARATUS, AND PROCESS UNIT MANUFACTURING METHOD

(71) Applicants: Ryohta Gotoh, Tokyo (JP); Kaoru Yoshino, Tokyo (JP); Satoshi Hatori, Kanagawa (JP); Hiromichi Ninomiya, Kanagawa (JP); Nobuyuki Taguchi, Kanagawa (JP); Yasuhito Kuboshima, Tokyo (JP); Naohiro Kumagai, Kanagawa (JP); Shinichi Kawahara, Tokyo (JP); Nobuo Kuwabara, Kanagawa (JP); Hideyasu Seki, Chiba (JP); Yuta Azeyanagi, Kanagawa (JP)

(72) Inventors: Ryohta Gotoh, Tokyo (JP); Kaoru Yoshino, Tokyo (JP); Satoshi Hatori, Kanagawa (JP); Hiromichi Ninomiya, Kanagawa (JP); Nobuyuki Taguchi, Kanagawa (JP); Yasuhito Kuboshima, Tokyo (JP); Naohiro Kumagai, Kanagawa (JP); Shinichi Kawahara, Tokyo (JP); Nobuo Kuwabara, Kanagawa (JP); Hideyasu Seki, Chiba (JP); Yuta Azeyanagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/191,683

(22) Filed: Feb. 27, 2014

(65) Prior Publication Data
US 2014/0270881 A1 Sep. 18, 2014

(30) Foreign Application Priority Data

Mar. 13, 2013 (JP) ................................. 2013-050445
Mar. 13, 2013 (JP) ................................. 2013-050448
Mar. 13, 2013 (JP) ................................. 2013-050452

(51) Int. Cl.
G03G 21/00 (2006.01)
F16N 11/04 (2006.01)
B23P 11/02 (2006.01)

(52) U.S. Cl.
CPC .... *G03G 21/0094* (2013.01); *G03G 2215/0132* (2013.01); *Y10T 29/49863* (2015.01)

(58) Field of Classification Search
CPC .................. G03G 21/0005; G03G 2221/0005; F16N 11/04; B23P 11/02
USPC .......................... 399/346; 184/14; 29/445, 446
See application file for complete search history.

(56) References Cited

U.S. PATENT DOCUMENTS

| | | |
|---|---|---|
| 2007/0059067 A1 | 3/2007 | Tanaka et al. |
| 2007/0068738 A1* | 3/2007 | Kawahara et al. .............. 184/99 |
| 2007/0172273 A1 | 7/2007 | Harada et al. |
| 2008/0063447 A1 | 3/2008 | Kawahara et al. |
| 2008/0170897 A1 | 7/2008 | Harada |
| 2009/0010693 A1 | 1/2009 | Hatori et al. |
| 2009/0060600 A1 | 3/2009 | Ninomiya et al. |

(Continued)

FOREIGN PATENT DOCUMENTS

| | | |
|---|---|---|
| CN | 1936726 A | 3/2007 |
| CN | 101004583 A | 7/2007 |

(Continued)

OTHER PUBLICATIONS

Office Action for Corresponding Chinese Patent Application No. 201410090563.4 issued on Oct. 10, 2015.

*Primary Examiner* — Erika J Villaluna
(74) *Attorney, Agent, or Firm* — Harness, Dickey & Pierce, P.L.C.

(57) ABSTRACT

A lubricant supply device includes a solid lubricant, a lubricant holder to hold the solid lubricant, a lubricant supply member to supply lubricant to a lubrication target, a pressing member to press the solid lubricant toward the lubricant supply member, and a pressing force adjuster to change an amount of pressing force exerted by the pressing member.

20 Claims, 26 Drawing Sheets

(56) References Cited

U.S. PATENT DOCUMENTS

| | | |
|---|---|---|
| 2009/0103944 A1 | 4/2009 | Shintani et al. |
| 2009/0120356 A1 | 5/2009 | Karasawa et al. |
| 2011/0076075 A1 | 3/2011 | Arai et al. |
| 2011/0217101 A1 | 9/2011 | Okamoto et al. |
| 2011/0274474 A1 | 11/2011 | Arai et al. |
| 2012/0234188 A1 | 9/2012 | Kawahara et al. |
| 2013/0243449 A1 | 9/2013 | Hatori et al. |
| 2013/0251380 A1 | 9/2013 | Fujimori et al. |
| 2014/0037302 A1 | 2/2014 | Gotoh et al. |

FOREIGN PATENT DOCUMENTS

| | | |
|---|---|---|
| CN | 102467055 A | 5/2012 |
| JP | 2007-293240 | 11/2007 |
| JP | 2009-015034 | 1/2009 |
| JP | 2010-072564 A | 4/2010 |
| JP | 2010-282188 | 12/2010 |

\* cited by examiner

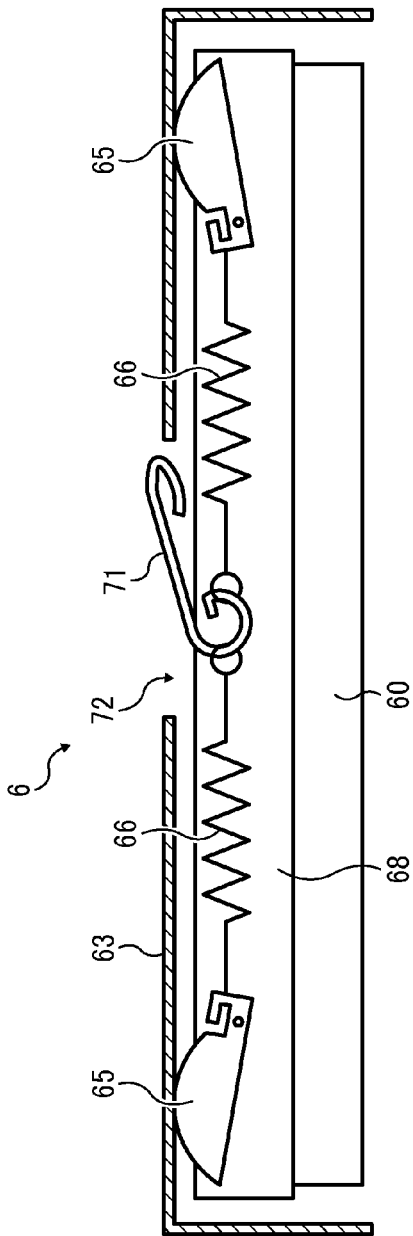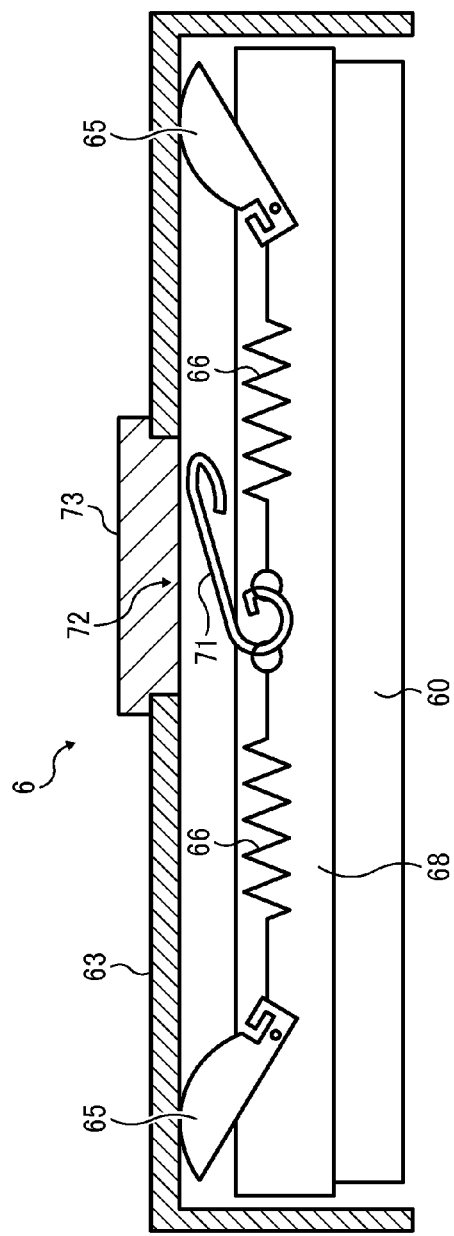

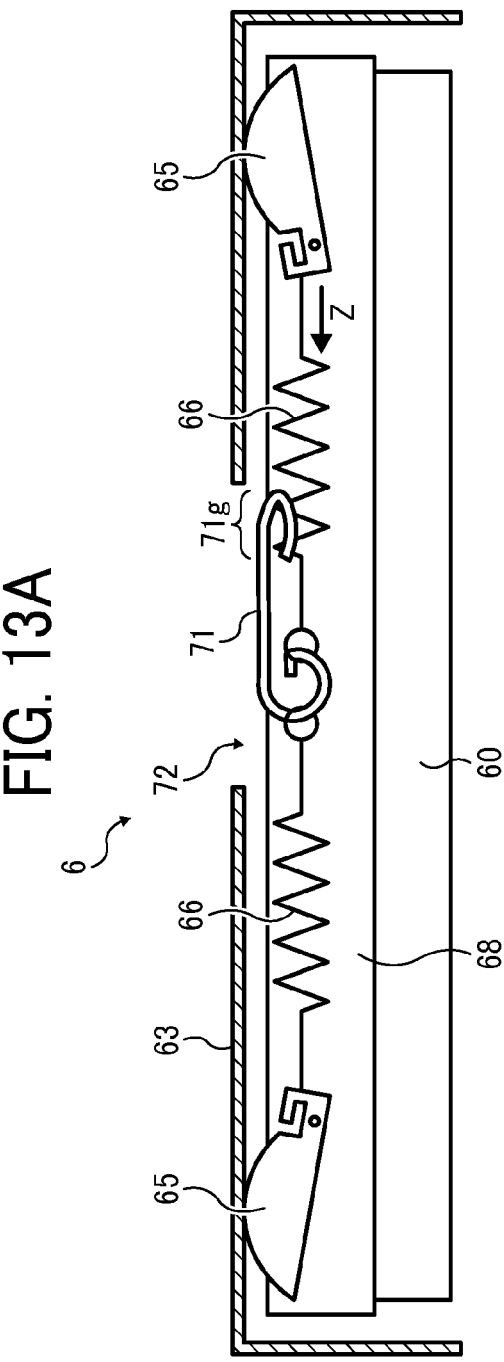
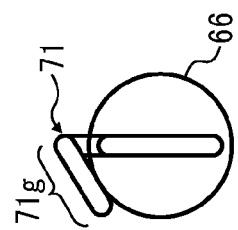

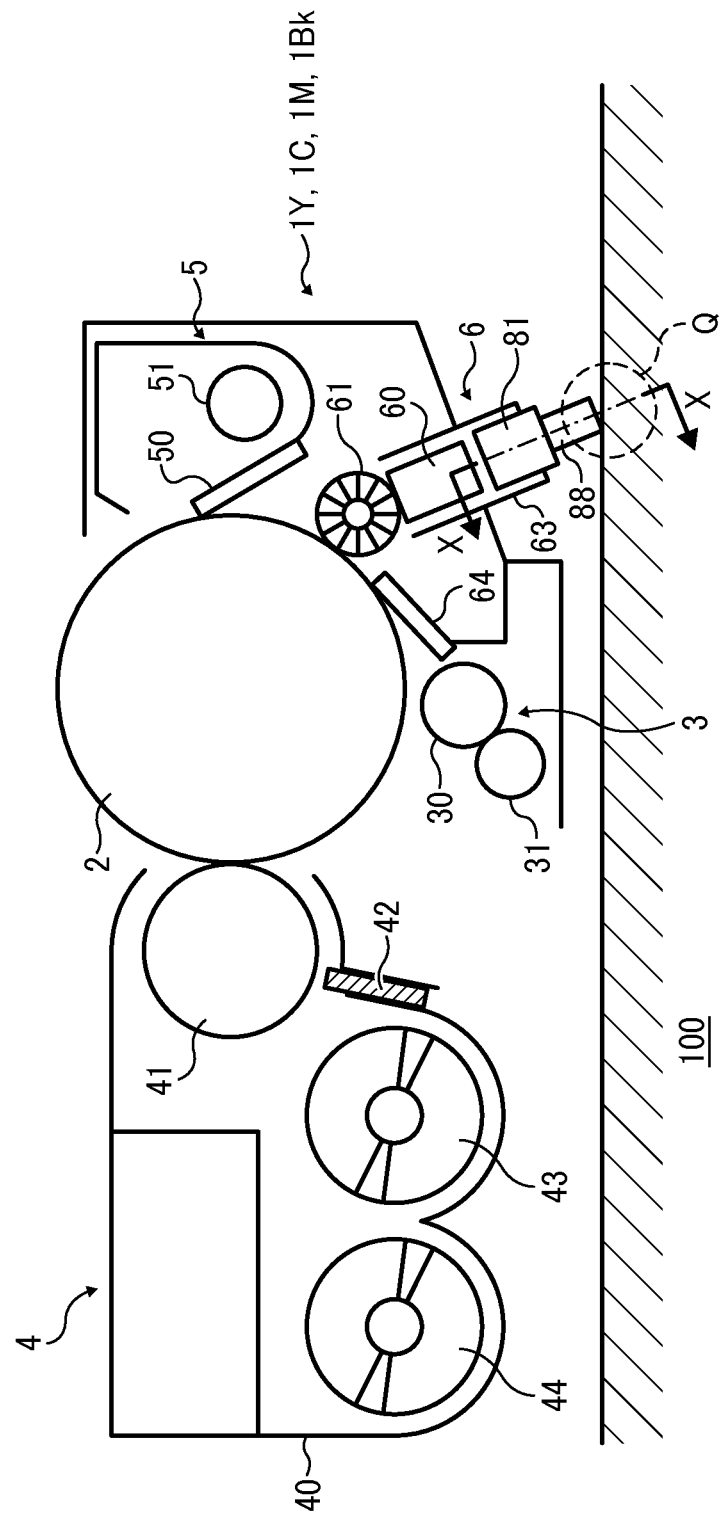

LUBRICANT SUPPLY DEVICE, PROCESS UNIT, IMAGE FORMING APPARATUS, AND PROCESS UNIT MANUFACTURING METHOD

CROSS-REFERENCE TO RELATED APPLICATIONS

This patent application is based on and claims priority pursuant to 35 U.S.C. §119 to Japanese Patent Application Nos. 2013-050452, 2013-050445, and 2013-050448, all filed on Mar. 13, 2013, in the Japan Patent Office, the entire disclosure of each of which is hereby incorporated by reference herein.

BACKGROUND OF THE INVENTION

1. Technical Field

The present invention generally relates to a lubricant supply device and a process unit and an image forming apparatus including a lubricant supply device and further relates to a method of manufacturing a process unit including a lubricant supply device.

2. Description of the Background Art

In image forming apparatuses such as copiers, printers, facsimile machines, and multifunction machines (so-called multifunction peripherals or MFPs) having at least two of coping, printing, facsimile transmission, plotting, and scanning capabilities, typically a lubricant supply device is used to lubricate a photoreceptor, an intermediate transfer belt, or the like to facilitate cleaning thereof, enhance the transfer capabilities thereof, and extend the operational lives thereof.

For example, the lubricant supply device includes a lubricant supply member (i.e., lubricant application member), such as a brush roller, disposed between a lubrication target, such as the photoreceptor, and a solid lubricant and designed to scrape off lubricant and apply the lubricant to the surface of the photoreceptor. Such a configuration is proposed in JP-2007-293240-A. The solid lubricant is urged toward the brush roller by a pressing member such as a spring so that the solid lubricant is kept in contact with the brush roller constantly even when the lubricant is scraped and consumed.

SUMMARY OF THE INVENTION

In view of the foregoing, one embodiment of the present invention provides a lubricant supply device that includes a solid lubricant, a lubricant holder to hold the solid lubricant, a lubricant supply member to supply lubricant to a lubrication target, a pressing member to press the solid lubricant toward the lubricant supply member, and a pressing force adjuster to change an amount of pressing force exerted by the pressing member.

Another embodiment provides a process unit that is removably mounted in an apparatus body of an image forming apparatus and includes a photoreceptor to be lubricated and the lubricant supply device described above.

Yet another embodiment provides an image forming apparatus that includes the photoreceptor and the lubricant supply device described above.

Yet another embodiment provides a method of manufacturing a process unit including a photoreceptor to be lubricated and a lubricant supply device provided with a pressing member to press a solid lubricant to a lubricant supply member. The method includes a step of retaining the pressing member to exert a predetermined amount of bias force in assembling of the lubricant supply device; and a step of changing the amount of bias force exerted by the pressing member as required after the lubricant supply device is assembled.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 illustrates a configuration in which an opening is formed in a case so that the switching member is operated externally;

FIG. 11 illustrates a configuration in which a lid to close the opening is provided to the case;

FIG. 13A is a front view of a switching member according to a variation, that is shaped not to project from the opening shown in FIG. 10;

FIG. 13B illustrates the configuration shown in FIG. 13A as viewed in a direction Z shown in FIG. 13A;

FIG. 31A is an end-on axial view of a process unit as a variation of the third embodiment, provided with an interference portion to prevent wrong installation thereof;

DETAILED DESCRIPTION

Figure 1:
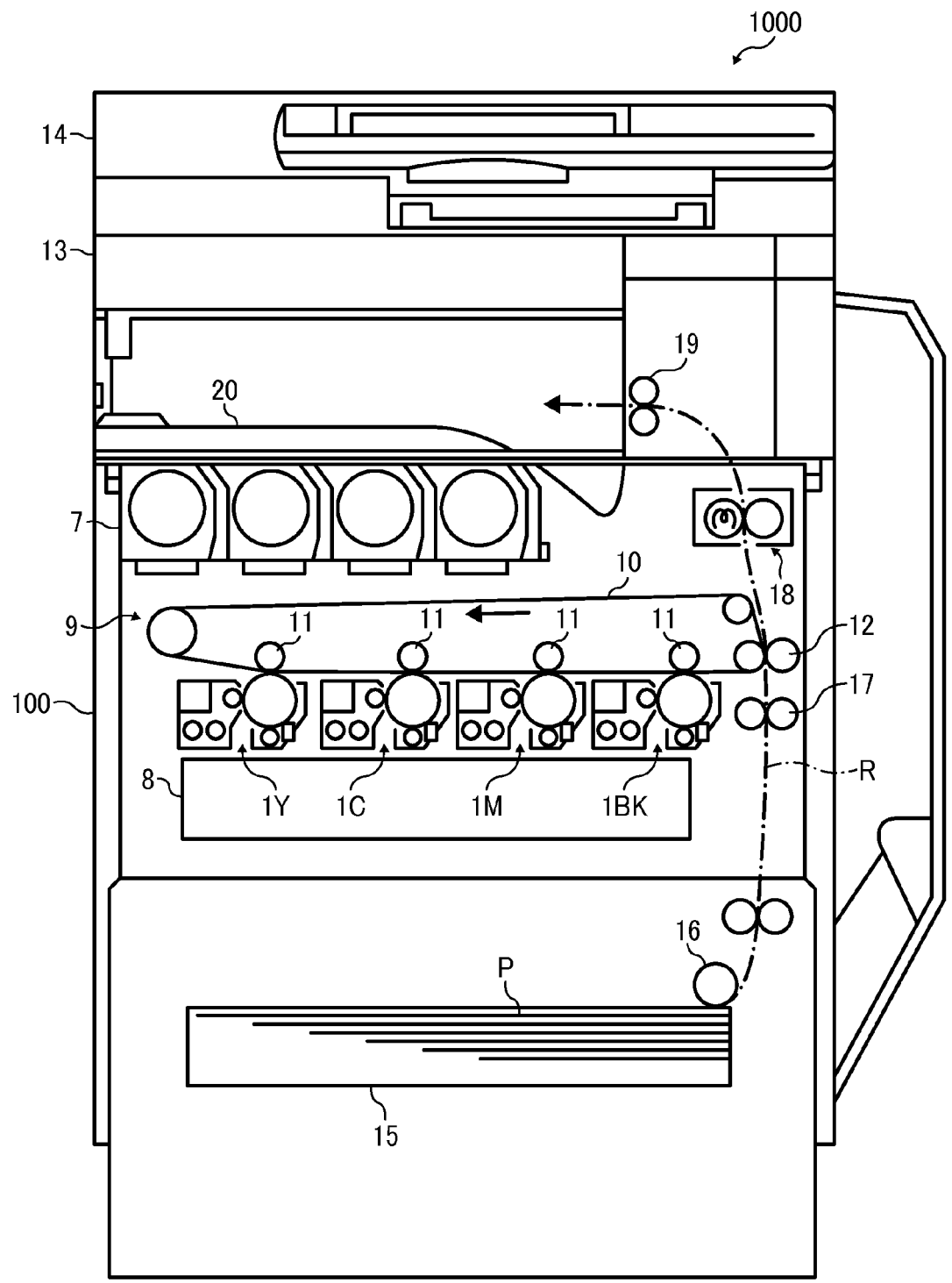
FIG. 1 is a schematic view of an image forming apparatus according to an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

The amount of lubricant supplied by a lubricant supply member such as a brush roller varies in accordance with, in addition to the force with which a solid lubricant is pressed to the brush roller, the rotational velocity of the brush roller. Generally, as the rotational velocity of the brush roller decreases, the amount of lubricant scrapped off by the brush roller decreases, and the amount of lubricant supplied decreases accordingly. For example, in a case where common driving sources are used for brush rollers and photoreceptors of different machine types, in a machine type in which the velocity of the photoreceptor is different, the rotational velocity of the brush roller is different accordingly. In this case, it is necessary to set the pressing force for each machine type.

Further, in multicolor image forming apparatuses, there are cases where the amount of lubricant supplied differs depending on the charge type between the image forming unit for forming black images and the charge type of the image forming unit for forming other color images. In this case, the pressing force is set to different amounts between the image forming unit for black and other image forming units.

In conventional lubricant supply devices, however, it is difficult to change the pressing force. Therefore, pressing members in multiple types are produced to satisfy an inherent amount of pressing force for each machine type or each image forming unit. Accordingly, inventory management and assembling work are complicated.

In view of the foregoing, an aim of embodiments described below is to provide a lubricant supply device in which the pressing force to press a solid lubricant to a lubricant supply member can be changed easily; a process unit and an image forming apparatus incorporating the lubricant supply device; and a method of manufacturing the process unit.

It is to be understood that like reference numerals designate identical or corresponding parts throughout the several views thereof, and redundant descriptions are omitted or simplified below.

Referring now to FIG. 1, a multicolor image forming apparatus according to an embodiment of the present invention is described.

Figure 2:
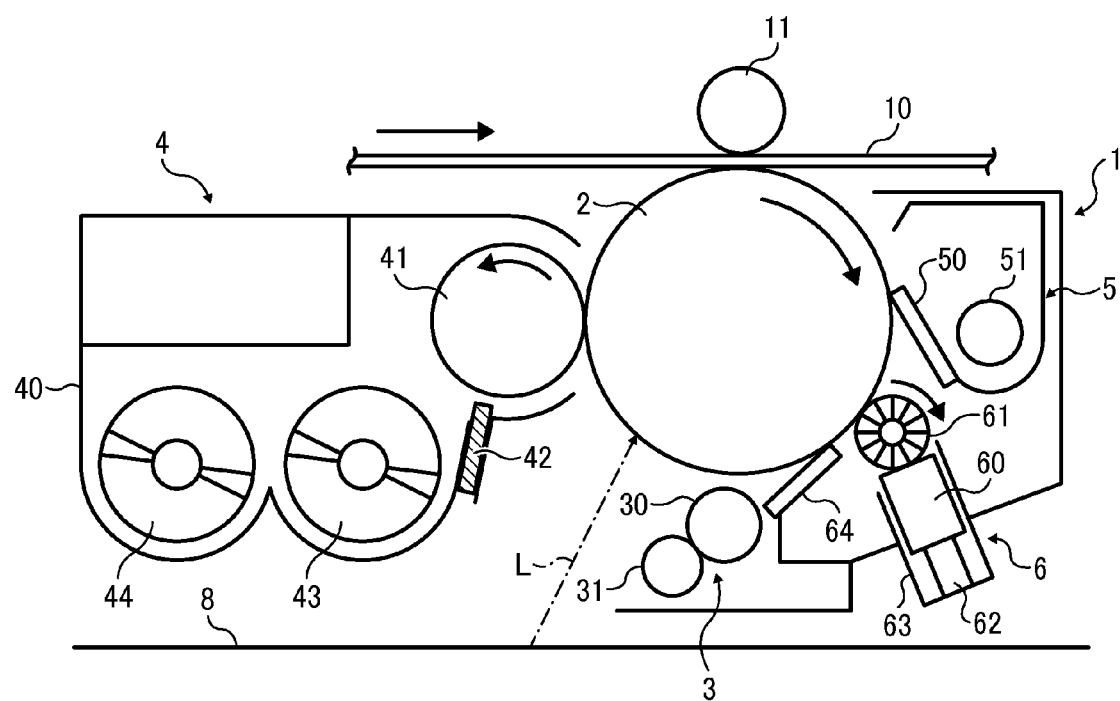
FIG. 2 is a schematic view illustrating a process unit included in the image forming apparatus shown in FIG. 1.

FIG. 1 is a schematic view of an image forming apparatus according to an embodiment of the present invention, and FIG. 2 is a schematic view illustrating a process unit (i.e., an image forming unit) included in the image forming apparatus shown in FIG. 1.

An image forming apparatus 1000 shown in FIG. 1 includes four process units (image forming units) 1Y, 1C, 1M, and 1Bk removably installable in an apparatus body 100 thereof. The process units 1Y, 1C, 1M, and 1Bk respectively contain yellow (Y), magenta (M), cyan (C), and black (Bk) developer (i.e., toner) corresponding to decomposed color components of full-color images and have a similar configuration except the color of developer contained therein.

It is to be noted that the suffixes Y, M, C, and K attached to each reference numeral indicate only that components indicated thereby are used for forming yellow, magenta, cyan, and black images, respectively, and hereinafter may be omitted when color discrimination is not necessary.

More specifically, as shown in FIG. 2, each process unit 1 includes a drum-shaped photoreceptor 2 serving as an image bearer, a charger 3 to charge the surface of the photoreceptor 2, a developing device 4 to supply toner to the surface of the photoreceptor 2, a cleaning unit 5 to clean the surface of the photoreceptor 2, and a lubricant supply device 6 to supply lubricant to the surface of the photoreceptor 2.

The charger 3 includes a charging roller 30 disposed in contact with the photoreceptor 2 and a roller cleaner 31 disposed to contact the charging roller 31.

The developing device 4 includes a development casing 40 to contain toner serving as developer, a developing roller 41 to bear toner on its surface, a doctor blade 42 serving as a developer regulator to regulate the amount of toner on the developing roller 41, and conveying screws 43 and 44 to transport toner contained in the development casing 40 to the developing roller 41. The developing roller 41 is disposed facing the photoreceptor 2 via an opening formed in the development casing 40.

The cleaning unit 5 includes a cleaning blade 50 disposed to contact the photoreceptor 2 to remove toner remaining on the photoreceptor 2 and a waste-toner conveying coil 51 to transport the removed toner to a waste toner bottle.

The lubricant supply device 6 includes a solid lubricant 60, a supply roller 61 serving as a lubricant supply member, a pressing member 62 to press the solid lubricant 60 toward the supply roller 61, a case 63 to house the solid lubricant 60 and the pressing member 62, and a leveling blade 64 to level off lubricant supplied to the photoreceptor 2 into a uniform thin layer. The supply roller 61 is disposed in contact with the surface of the photoreceptor 2 and rotatable in the reverse (counter) direction to the direction of rotation of the photoreceptor 2 in the contact position with the photoreceptor 2. The supply roller 61 can be a brush roller including a number of fibers on the surface thereof, or a urethane roller constructed of foam polyurethane.

The solid lubricant 60 in the present embodiment includes zinc stearate as a main ingredient. More specifically, the solid lubricant 60 preferably includes a lubricating oil additive consisting essentially of zinc stearate, dissolved therein, so that no adverse effect is caused by excessive lubrication and a sufficient lubricity is attained. Zinc stearate is a typical lamellar crystal powder. Lamellar crystals have a layer structure including self-organization of an amphiphilic molecule, and the crystal is broken easily along junctures between layers and becomes slippery receiving shearing force. Accordingly, friction on the surface of the photoreceptor 2 can be reduced.

That is, the surface of the photoreceptor 2 can be coated effectively with a small amount of lubricant by lamellar crystals that cover the surface of the photoreceptor 2 uniformly upon shearing force.

It is to be noted that, in addition to zinc stearate, examples of the solid lubricant 60 include those including a stearate group such as barium stearate, iron stearate, nickel stearate, cobalt stearate, stearate copper, strontium stearate, and calcium stearate. Examples of the solid lubricant 60 further include those including a similar fatty acid group such as zinc oleate, barium oleate, lead oleate, and oleate compounds similar to the stearate compounds listed above; and zinc palmitate, barium palmitate, lead palmitate, and palmitate compounds similar to the stearate compounds listed above. Additionally, as fatty acid groups, caprylic acid, linolenic acid, co-linolenic acid can be used. Further, candelilla wax, carnauba wax, rice wax, Japan wax, jojoba oil, beeswax, and lanolin can be used.

Those listed above can become solid organic lubricant easily and go well with toner. Yet further, in addition to organic lubricants, the solid lubricant 60 may be those including the fatty acid groups mentioned above and at least boron nitride, which is an inorganic lubricant, mixed therein.

Referring back to FIG. 1, an overall configuration of the image forming apparatus 1000 is described below.

Multiple toner bottles 7 are removably mountable in the apparatus body 100. The toner bottles 7 contain different color toners, and toner is transported from the toner bottle 7 through a toner conveying tube to the corresponding developing device 4.

An exposure unit 8 is provided beneath the process units 1 in FIG. 1 to expose to light the surface of each photoreceptor 2. The exposure device 8 emits laser beams L (shown in FIG. 2) to the respective photoreceptors 2.

Additionally, a transfer device 9 is provided above the process units 1. The transfer device 9 includes an intermediate transfer belt 10 that can be an endless belt, four primary-transfer rollers 11 serving as primary transfer members, and a secondary-transfer roller 12 serving as a secondary transfer member. The intermediate transfer belt 10 is stretched around multiple support rollers. As one of the support rollers rotates, the intermediate transfer belt 10 rotates in the direction indicated by arrow shown in FIG. 1.

The four primary-transfer rollers 11 are disposed in contact with the respective photoreceptors 2 via the intermediate transfer belt 10. Thus, the photoreceptor 2 contacts the intermediate transfer belt 10, forming a primary-transfer nip therebetween, where toner is transferred to the photoreceptor 2. Each primary-transfer roller 11 is electrically connected to a power source and receives a predetermined amount of voltage including at least one of direct-current (DC) voltage and alternating current (AC) voltage.

The secondary-transfer roller 12 contacts, via the intermediate transfer belt 10, one of the support rollers around which the intermediate transfer belt 10 is stretched. Thus, a secondary-transfer nip is formed between the secondary-transfer roller 12 and the intermediate transfer belt 10 for secondary image transfer. Similarly to the primary-transfer rollers 11, the secondary-transfer roller 12 is electrically connected to a power source and receives a predetermined amount of voltage including at least one of DC voltage and AC voltage.

Above the apparatus body 100, a document reading unit 13 to read image data of originals and a document conveyance unit 14 to transport originals to the document reading unit 13 are provided.

Beneath the apparatus body 100, a sheet tray 15 for containing sheets P, serving as recording media, and a feed roller 16 to feed the sheets P from the sheet tray 15 are provided. The recording media include, in addition to standard copy paper, heavy paper, post cards, thin paper such as tracing paper, coated paper, overhead projector (OHP) films, and special purpose sheets.

A conveyance path R is formed inside the apparatus body 100, and the sheet P is conveyed from the sheet tray 15 to the secondary-transfer nip and further outside the apparatus body 100 along the conveyance path R. On the conveyance path R, a pair of registration rollers 17 (timing rollers) is provided between the feed roller 16 and the secondary-transfer roller 12. Additionally, a fixing device 18 to fix the toner image on the sheet P is provided on the conveyance path R downstream from the secondary-transfer roller 12 in the direction in which the sheet P is transported (hereinafter "sheet conveyance direction"). At the end of the conveyance path R, a pair of discharge rollers 19 is provided to discharge the sheet P outside the apparatus body 100, and a discharge tray 20 is provided to the apparatus body 100.

Operation of the image forming apparatus 1000 is described below.

When image formation is started, the photoreceptors 2 in the respective process units 1 are rotated, and the charging rollers 30 uniformly charge the surfaces of the photoreceptors 2 to a predetermined polarity. Then, the exposure device 8 directs laser beams L onto the charged surfaces of the respective photoreceptors 2 according to, for example, image data of originals read by the document reading unit 13 or acquired from external devices such as computers. Thus, electrostatic latent images are formed on the respective photoreceptors 2. At that time, each photoreceptor 2 is exposed accordingly single color data, namely, yellow, cyan, magenta, or black color data decomposed from full-color image data to be recorded.

The electrostatic latent images formed on the photoreceptors 2 are developed into toner images with toner supplied by the respective developing devices 4. Specifically, after the doctor blade 42 adjusts the layer thickness of toner carried on the developing roller 41 that rotates counterclockwise in FIG. 2, toner is transported to the development range between the developing roller 41 and the photoreceptor 2. In the development range, toner electrostatically adheres to the electrostatic latent image formed on the photoreceptor 2, thus developing it into a toner image.

Additionally, when the image forming operation is started, the intermediate transfer belt 10 is rotated. The predetermined voltage (i.e., transfer bias voltage), polarity of which is opposite of toner charging polarity, is applied to the respective primary-transfer rollers 11, thus forming transfer electrical fields in the primary-transfer nips. The transfer bias voltage may be a constant voltage or voltage controlled in constant-current control method.

The transfer electrical fields generated in the primary-transfer nips transfer the toner images from the respective photoreceptors 2 and superimpose them one on another on the intermediate transfer belt 10. Thus, a multicolor toner image is formed on the intermediate transfer belt 10.

After primary transfer, the cleaning units 5 remove toner remaining on the respective photoreceptors 2. Specifically, the cleaning blade 50 shown in FIG. 2 removes toner remaining on the photoreceptor 2, and the waste-toner conveying coil 51 transports toner thus collected to the waste-toner bottle. Then, the rotating supply roller 61 applies lubricant onto the surface of the photoreceptor 2, and the leveling blade 64 levels off the lubricant on the photoreceptor 2.

In the lower portion of the image forming apparatus 1000, the feed roller 16 starts rotating, sending out the sheet P from the sheet tray 15 to the conveyance path R. Then, the registration rollers 17 forward the sheet P to the secondary-transfer nip formed between the secondary-transfer roller 12 and the intermediate transfer belt 10, timed to coincide with the multicolor toner image on the intermediate transfer belt 10. At that time, the transfer bias voltage whose polarity is opposite that of the toner image on the intermediate transfer belt 10 is applied to the secondary-transfer roller 12, and thus the transfer electrical field is formed in the secondary-transfer nip.

When the rotating intermediate transfer belt 10 reaches the secondary-transfer nip, the toner image is transferred from the intermediate transfer belt 10 onto the sheet P by the transfer electrical fields generated in the secondary-transfer nip.

Subsequently, the toner image is fixed on the sheet P by the fixing device 18. The pair of discharge rollers 19 discharges the sheet P outside the apparatus, to the discharge tray 20.

It is to be noted that, although the description above concerns multicolor image formation, alternatively, the image forming apparatus 1000 can form single-color images, bicolor images, or three-color images using one, two, or three of the four process units 1.

[First Embodiment]

Descriptions are given below of the lubricant supply device 6 according to a first present embodiment.

Figure 3A:
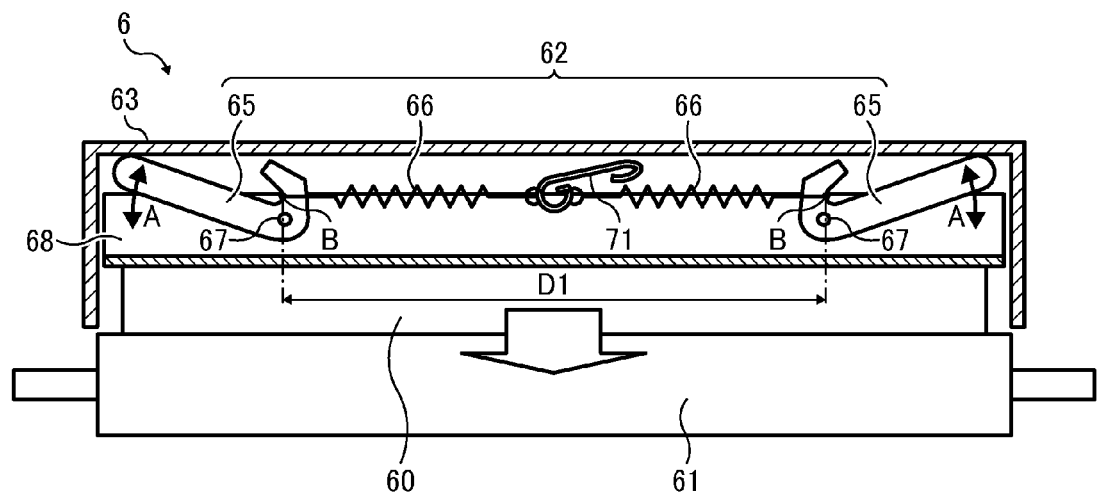
FIGS. 3A and 3B are front views of a lubricant supply device according to a first embodiment, as viewed in the direction perpendicular to both a longitudinal direction of a solid lubricant and a direction in which the lubricant is pressed to a supply roller.
Figure 3B:
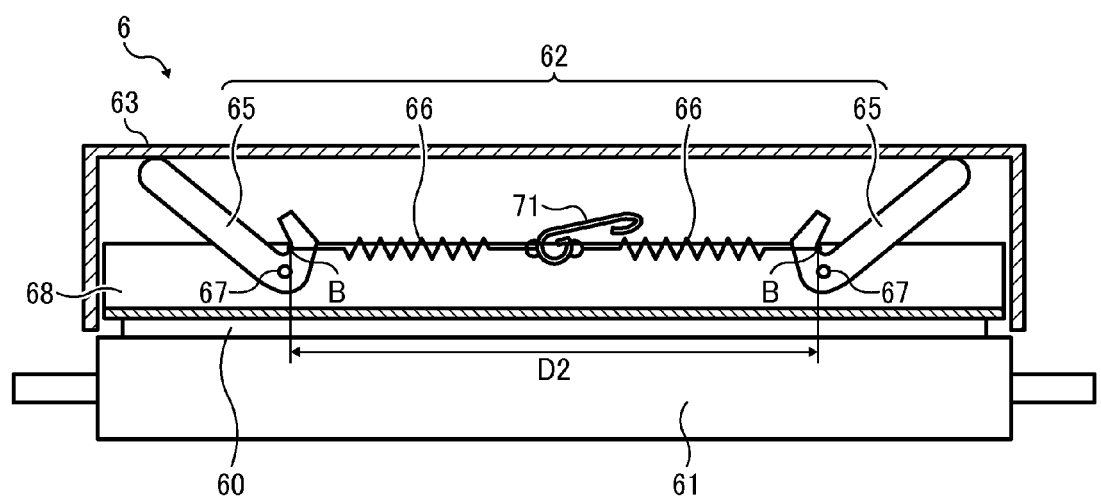

FIGS. 3A and 3B are front views of the lubricant supply device 6 according to the present embodiment, as viewed in the direction perpendicular to both the longitudinal direction (lateral direction in FIGS. 3A and 3B) of the solid lubricant 60 and the direction in which the lubricant is pressed to the supply roller 61 (upward in FIGS. 3A and 3B).

As shown in FIGS. 3A and 3B, the pressing member 62 according to the present embodiment includes a pair of arms 65 to press the solid lubricant 60, and a pair of springs 66, serving as an elastic member, each urging the arm 65. The arms 65 are disposed symmetrically with respect to a center in the longitudinal direction of the solid lubricant 60. Each arm 65 is pivotable in the direction indicated by arrow A shown in FIG. 3A about a support shaft 67 provided to a lubricant holder 68 holding the solid lubricant 60. The lubricant holder 68 extends in the longitudinal direction of the solid lubricant 60 in the configuration shown in the drawings. The springs 66, each of which is a tension spring in the configuration shown in FIGS. 3A and 3B, are hooked between the arms 65 in an elongated state longer than its natural length. The spring 66 is hooked on one end of the arm 65. As one end of the arm 65 is pulled to the side of the spring 66 by the bias force of the spring 66, the other end of the arm 65 contacts the case 63 and is kept pressing the case 63. Receiving reactive force from the force pressing the case 63, the lubricant holder 68 and the solid lubricant 60 held thereby are pressed to the supply roller 61.

As the solid lubricant 60 is consumed and becomes smaller from the state shown in FIG. 3A, the arms 65 are rotated by the pulling force exerted by the springs 66 as shown in FIG. 3B. As the arms 65 rotate or pivot in response to the consumption of the solid lubricant 60, the solid lubricant 60 can be pressed to the supply roller 61 and retained in that state.

Additionally, the present embodiment is designed such that a hooked position B where the spring 66 is hooked on the arm 65 does not easily change even when the arm 65 rotates. That is, the hooked position B is disposed close to the support shaft 67. This arrangement can reduce fluctuations in the distance between the respective hooked positions B, that is, differences between a distance D1 (shown in FIG. 3A) between the hooked positions B before the arms 65 rotate and a distance D2 (shown in FIG. 3B) between the hooked positions B after the arms 65 rotate. Accordingly, this arrangement can reduce fluctuations in the pressing force inherent to the consumption of the solid lubricant 60.

The lubricant supply device 6 according to the present embodiment further includes a switching member 71 serving as the pressing force adjuster.

Figure 4A:
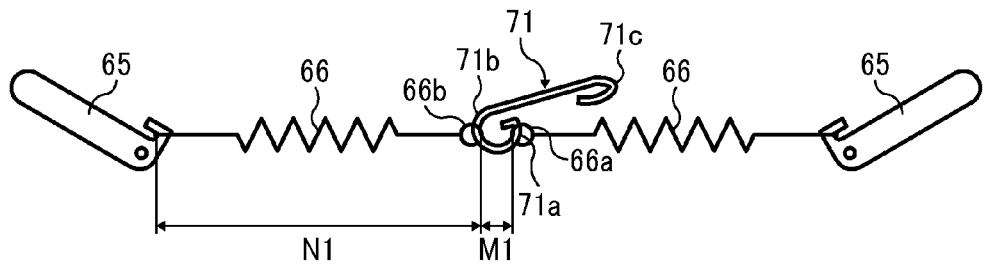
FIG. 4A is a schematic diagram illustrating a switching member according to an embodiment, being in a first posture.
Figure 4B:
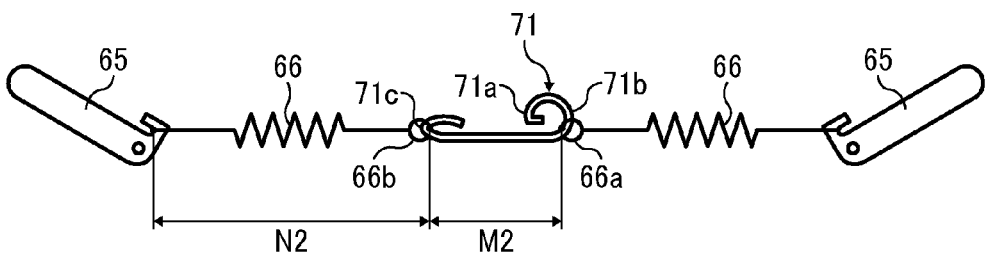
FIG. 4B is a schematic diagram illustrating the switching member being in a second posture.

The switching member 71 is disposed between the pair of springs 66, and the posture thereof can be switched between a first posture shown in FIG. 4A and a second posture shown in FIG. 4B. Specifically, the switching member 71 can be moved between the first posture to connect together an end 66a of the spring 66 and an end 66b of the other spring 66 (i.e., a supporter to support the end 66a) with the distance (given reference character M1 in FIG. 4A) therebetween reduced in the biasing direction of the springs 66, and the second posture to connect together the ends 66a and 66b of the respective springs 66 with the distance (given reference character M2 in FIG. 4B) increased in the biasing direction of the springs 66. The material of the switching member 71 can be resin, metal, or the like, and metal is preferred when durability against pulling force of the springs 66 and impact is considered.

The switching member 71 includes first and second curved portions 71a and 71b that serve as two hook portions on which the ends 66a and 66b of the respective springs 66 are hooked when the switching member 71 is in the first posture shown in FIG. 4A. The switching member 71 further includes a third curved portion 71c different from the first and second curved portions 71a and 71b. Hereinafter the first, second, and third curved portions 71a, 71b, and 71c are also referred to as "curved portions 71a, 71b, and 71c" simply. When the switching member 71 is in the second posture shown in FIG. 4B, the second and third curved portions 71b and 71c serve as the two hook portions on which the ends 66a and 66b of the respective springs 66 are hooked.

Additionally, the ends 66a and 66b of the respective springs 66, hooked on the curved portions 71a, 71b, and 71c, are annular or circular. This configuration can facilitate removal and hooking of the curved portions 71a, 71b, and 71c on the ends 66a and 66b of the respective springs 66 and excels in operability.

Figure 5:
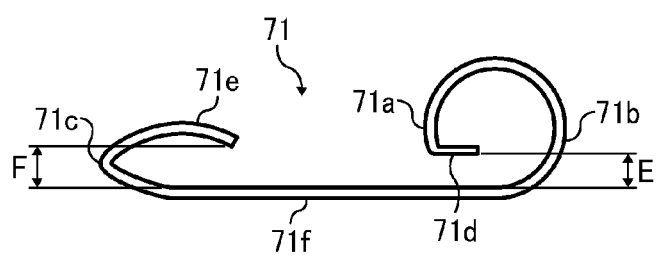
FIG. 5 is a front view of the switching member shown in FIGS. 4A and 4B.

Referring to FIG. 5, the first and second curved portions 71a and 71b are positioned on one side (on the right in FIG. 5) in the longitudinal direction of the switching member 71 and continuous with each other. The third curved portion 71c is positioned on the other side (on the left in FIG. 5) of the switching member 71 opposite the curved portions 71a and 71b. The third curved portion 71c is away from the first curved portion 71a and continuous with the second curved portion 71b.

Additionally, retainers 71d and 71e are formed at the end on the side of the first curved portion 71a and the end on the side of the third curved portion 71c to prevent the springs 66 from being disengaged. Specifically, the end on the side of the first curved portion 71a is folded toward the second curved portion 71b (to the right in FIG. 5), thus forming the retainer 71d. By contrast, the retainer 71e on the side of the third curved portion 71c is formed by folding the end of the switching member 71 on that side to the second curved portion 71b (to the right in FIG. 5) and further curving (downward in FIG. 5) the end toward a connecting portion 71f connecting together the second and third curved portions 71b and 71c.

Figure 6:
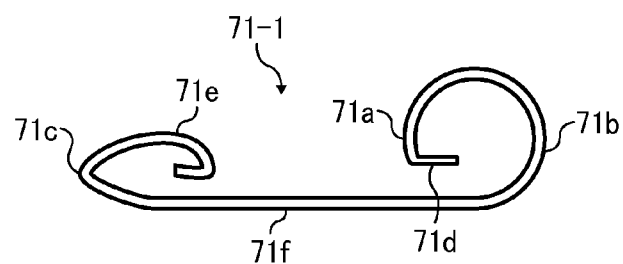
FIG. 6 is a variation of the switching member.

Additionally, as in a switching member 71-1 shown in FIG. 6 as a variation, the end of the retainer 71e on the side of the third curved portion 71c can be further folded to the third curved portion 71c (to the left in FIG. 6).

As shown in FIG. 5, a clearance E is secured between the end of the retainers 71d and the connecting portion 71f, and a clearance F is secured between the end of the retainer 71e and the connecting portion 71f. The clearances E and F are greater than the diameter of the wire rod forming the springs 66. This configuration is for the hooked ends 66a and 66b of the springs 66 to smoothly pass through the clearances E and F when moving between the second and the third curved portions 71b and 71c.

Figure 7A:
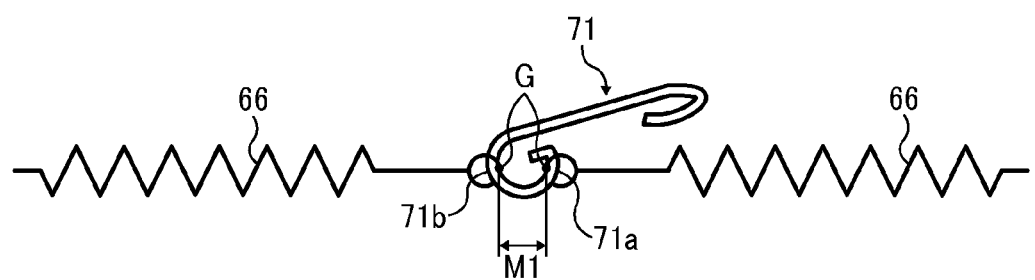
FIGS. 7A and 7B illustrate a switching member having first and second curved that follow an identical arc.
Figure 7B:
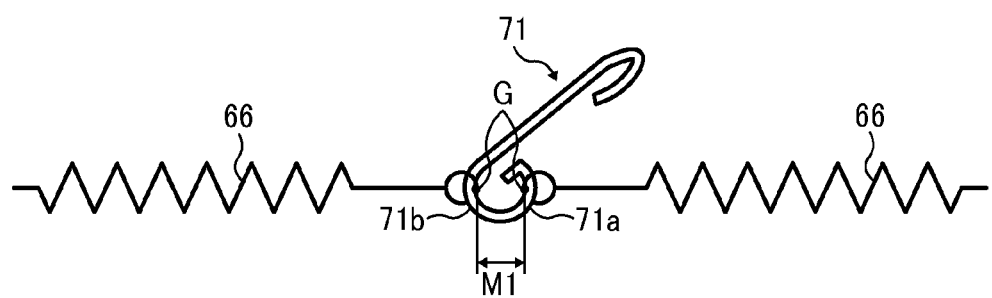

Additionally, in the present embodiment, the first and second curved portions 71a and 71b follow an identical or substantially identical arc. This configuration can inhibit fluctuations in the distance M1 between the ends 66a and 66b of the respective springs 66 hooked on the first and second curved portions 71a and 71b (i.e., distance between hook positions G) when the switching member 71 changes its posture to a certain degree in a state in which the springs 66 are hooked on the first and second curved portions 71a and 71b as shown in FIGS. 7A and 7B. In other words, the strength of the pressing force can be kept constant since the amount by which the springs 66 are elongated does not change even when the switching member 71 changes its posture to a certain degree.

Figure 8A:
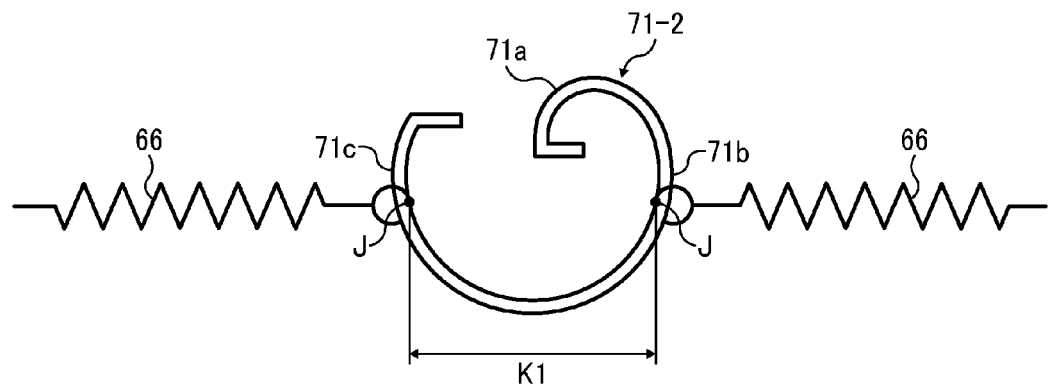
FIGS. 8A and 8B illustrate a switching member having second and third curved portions that follow an identical arc.
Figure 8B:
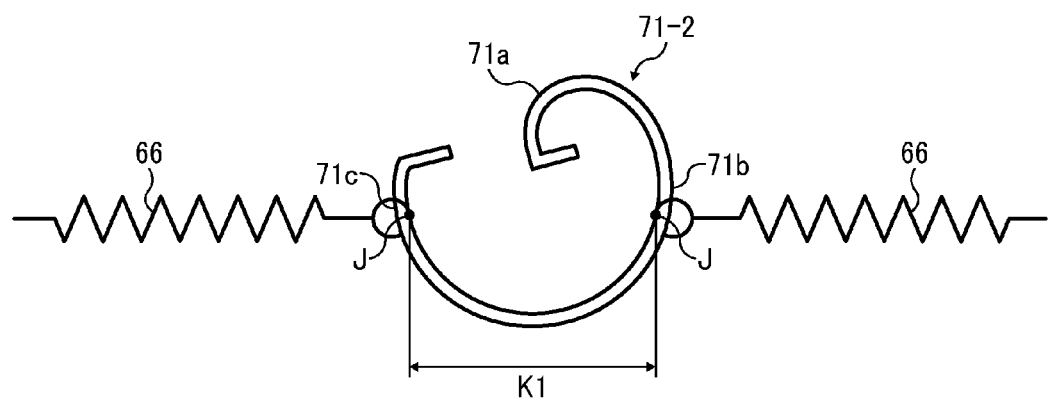

FIGS. 8A and 8B illustrate a switching member 71-2 as a similar approach. As shown in FIGS. 8A and 8B, instead of the first and second curved portions 71a and 71b, the second and third curved portions 71b and 71c may be formed to follow an identical or substantially identical arc. In this configuration as well, the strength of the pressing force can be kept constant since a distance K1 between hook positions J is not changed when the switching member 71 changes its posture to a certain degree in a state in which the springs 66 are hooked on the second and third curved portions 71b and 71c.

Figure 9A:
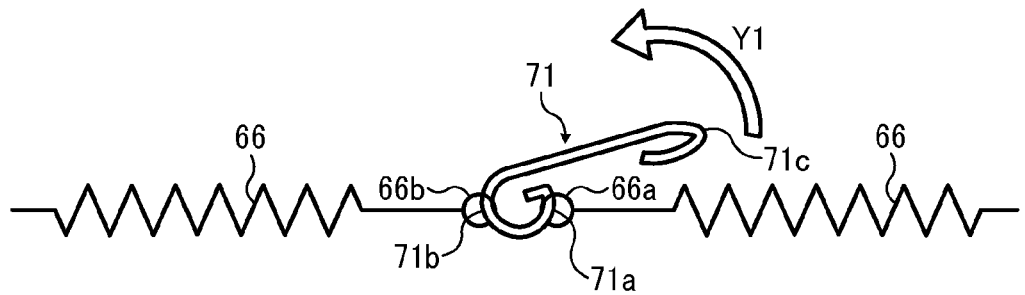
FIGS. 9A, 9B, and 9C are schematic diagrams illustrating movements of the switching member shown in FIGS. 7A and 7B.
Figure 9B:
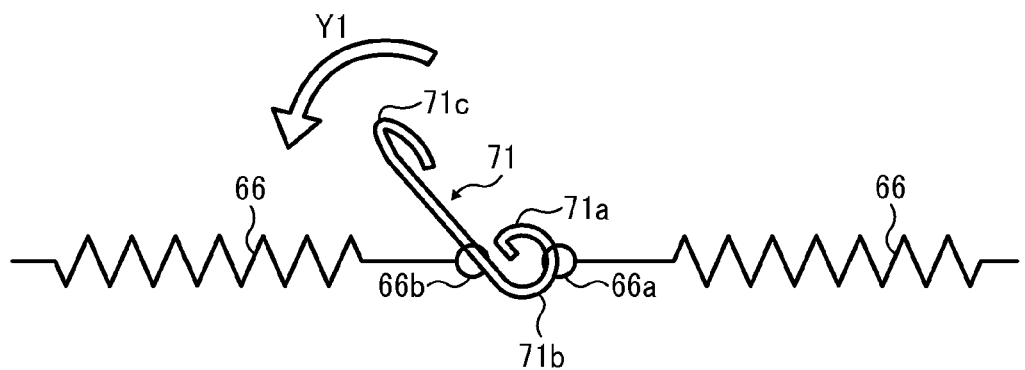
Figure 9C:
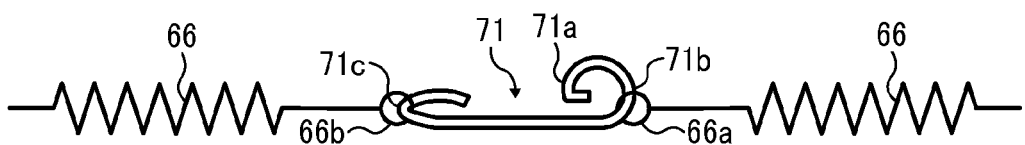

Referring to FIGS. 9A to 9C, descriptions are given below of switching the switching member 71 to change the pressing force pressing the solid lubricant 60 between a greater force to a smaller force.

Referring to FIG. 9A, the pressing force is greater when the switching member 71 is in the first posture. As the switching member 71 being in the first posture is rotated in the direction indicated by arrow Y1, the hooked ends 66a and 66b of the respective springs 66 move as shown in FIG. 9B. More specifically, in accordance with rotation of the switching member 71, the end 66a of the spring 66 on the right in FIGS. 9A to 9C, hooked on the first curved portion 71a, moves to the second curved portion 71b, and the end 66b of the spring 66 on the left in these drawings, hooked on the second curved portion 71b, moves to the third curved portion 71c.

When the switching member 71 is rotated further and reaches a certain rotation angle, the switching member 71 automatically rotates due to the pulling force exerted by the springs 66. Then, as shown in FIG. 9C, the switching member 71 is reversed to the second posture. When the switching member 71 thus takes the second posture, the end 66a of the spring 66 on the right in FIGS. 9A to 9C is hooked on the second curved portion 71b, and the end 66b of the spring 66 on the left in these drawings is hooked on the third curved portion 71c. The switching member 71 is retained in this state.

When the switching member 71 is switched from the first posture to the second posture as described above, the distance between the hook positions G of the respective springs 66 is increased from the distance M1 shown in FIG. 4A to the distance M2 shown in FIG. 4B. By contrast, the length of the spring 66 decreases from the length N1 shown in FIG. 4A to the length N2 shown in FIG. 4B. Consequently, the pulling force is weakened, and the strength of pressing force with which the solid lubricant 60 is pressed to the supply roller 61 is weakened accordingly. Thus, the pressing force can be reduced easily from the greater force to the smaller force by switching the switching member 71 from the first posture to the second posture.

As described above, in lubricant supply devices, typically there is a need of varying the force pressing the solid lubricant in accordance with differences in the configuration of the image forming apparatus, such as the rotational velocity of the supply roller, the charge type of the image forming unit, or the like.

In the present embodiment, however, the lubricant supply device 6 includes the pressing force adjuster with which the pressing force can be changed easily. In the embodiment shown in FIGS. 3A to 9C, the switching member 71 serves as the pressing force adjuster. The switching member 71 is preliminarily disposed in an identical posture (first or second posture) in all process units 1 in manufacturing, thereby setting the pressing force identical in all process units 1 regardless of differences in configurations, and the posture is changed as required later.

For example, when the switching member 71 is set in the first posture in manufacturing, the pressing force is set to the greater force. After the lubricant supply devices 6 is assembled in the process units 1, or at a final manufacturing process, the switching member 71 is switched to the second posture, as required, to reduce the pressing force to the smaller force. On the contrary, the switching member 71 can be preliminarily retained in the second posture and switched to the first posture to increase the pressing force as required.

For example, even when there is a possibility that the lubricant supply devices 6 are incorporated in both of a machine type in which the linear velocity of the supply roller 61 is faster and a machine type in which the linear velocity of the supply roller 61 is slower, the switching members 71 in the respective process units 1 are retained in identical posture (one of the first and second postures). In other words, regardless of the machine type in which the lubricant supply device is incorporated, the pressing force with which the solid lubricant 60 is pressed is set to the greater force to fit the slower machine type or the smaller force to fit the faster machine type. In a case where the switching member 71 is retained in the first posture to fit the slower machine type preliminarily (e.g., in manufacturing), when the lubricant supply device 6 is incorporated in the slower machine type, the posture of the switching member 71 is not changed and the lubricant supply device 6 is mounted as is. By contrast, when the lubricant supply device 6 is incorporated in the faster machine type, the pressing force can be smaller. Accordingly, the switching member 71 is switched to the second posture to reduce the pressing force.

Alternatively, the posture of the switching member 71 may be switched depending on the charge type between the image forming unit for forming black images and the charge type of the image forming unit for forming other color images. The pressing force can be changed easily to a suitable amount by preliminarily retaining the switching member 71 in either of the first and second postures and switching the posture to the other posture when the difference in charge type causes differences in the necessary amount of supply of lubricant.

It is preferred that the switching member 71 can be operated externally after the process unit 1 is assembled. For example, in a configuration in which the case 63 (shown in FIG. 2) of the lubricant supply device 6 is removable from the outside, the switching member 71 can be switched externally after assembling of the process unit 1 is completed. With this configuration, the pressing force can be changed easily at markets or user sites.

Additionally, as shown in FIG. 10, an opening 72 may be formed in the case 63 at the position where the switching member 71 is housed so that the switching member 71 can be operated from the outside. This configuration can eliminate the necessity of removal of the case 63 to switch the posture of the switching member 71 and thus further facilitate the switching.

Further, when the opening 72 is formed in the case 63, as shown in FIG. 11, it is preferred to provide a lid 73 to the opening 72 to inhibit scattering of lubricant and toner therefrom. In this configuration, the posture of the switching member 71 can be switched when the lid 73 is removed from the case 63. When the lid 73 is formed with a transparent material, the posture of the switching member 71 can be visually checked from the outside in a state in which the lid 73 closed.

Alternatively, the color or shaped of the lid 73 may be varied depending on the posture of the switching member 71. In this case, the posture of the switching member 71 (i.e., state of the switching member 71) can be known by confirming the difference in color or shape of the lid 73. Accordingly, this configuration can inhibit the occurrence of error that the apparatus is provided with a wrong lubricant supply device 6 or a wrong process unit 1 in which the pressing force is set to a different pressing force from the target pressing force.

Figure 12A:
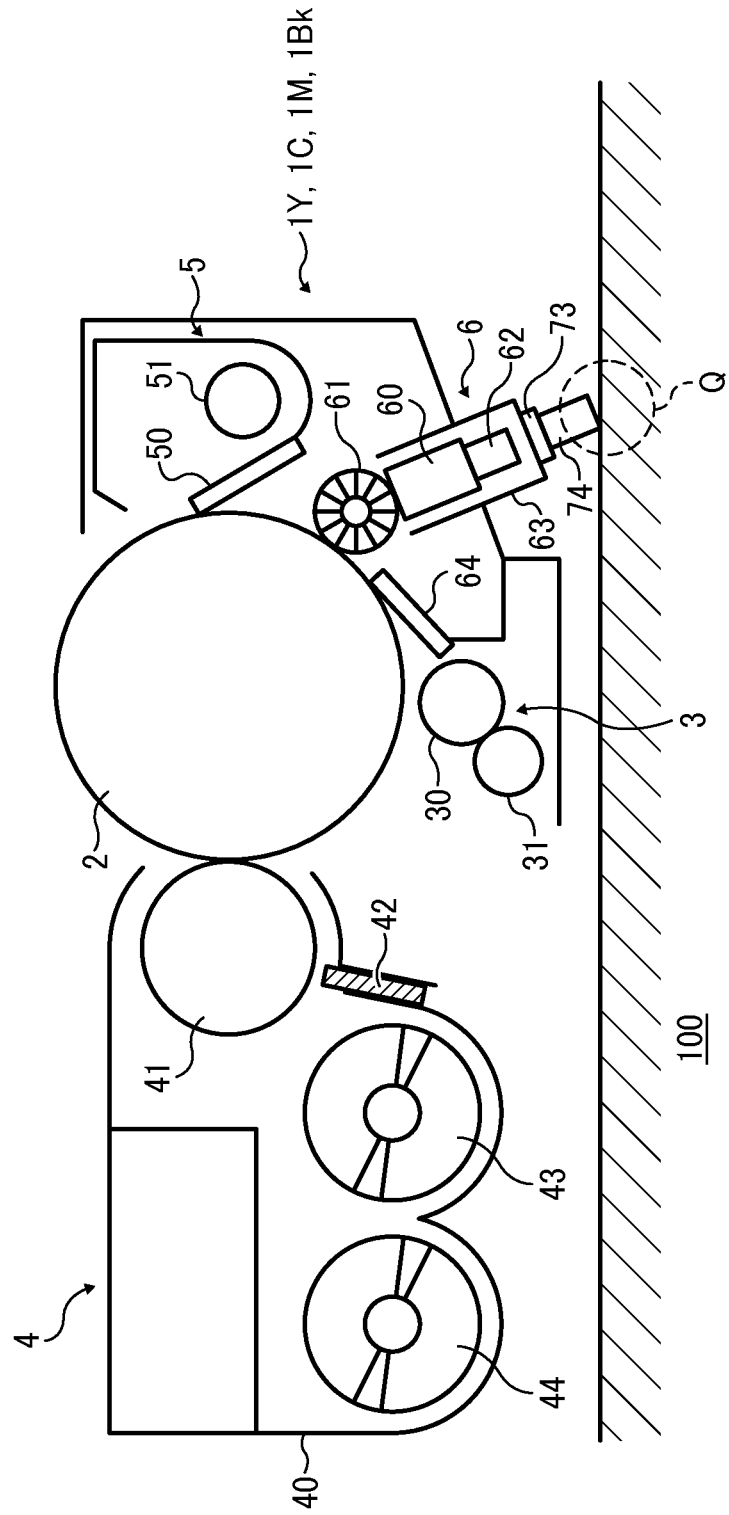
FIG. 12A is an end-on axial view of a process unit according to an embodiment, provided with an interference portion to prevent wrong installation of the process unit.

Yet additionally, the lid 73 may be provided with an interference portion, such as an interference projection 74 shown in FIG. 12A, designed to interfere with a frame of the apparatus body 100 (at the position indicated by a reference character Q shown in FIG. 12A) when the wrong lubricant supply device 6 or the wrong process unit 1 is installed. This configuration can prevent installation of the wrong lubricant supply device 6 or the wrong process unit 1.

Figure 12B:
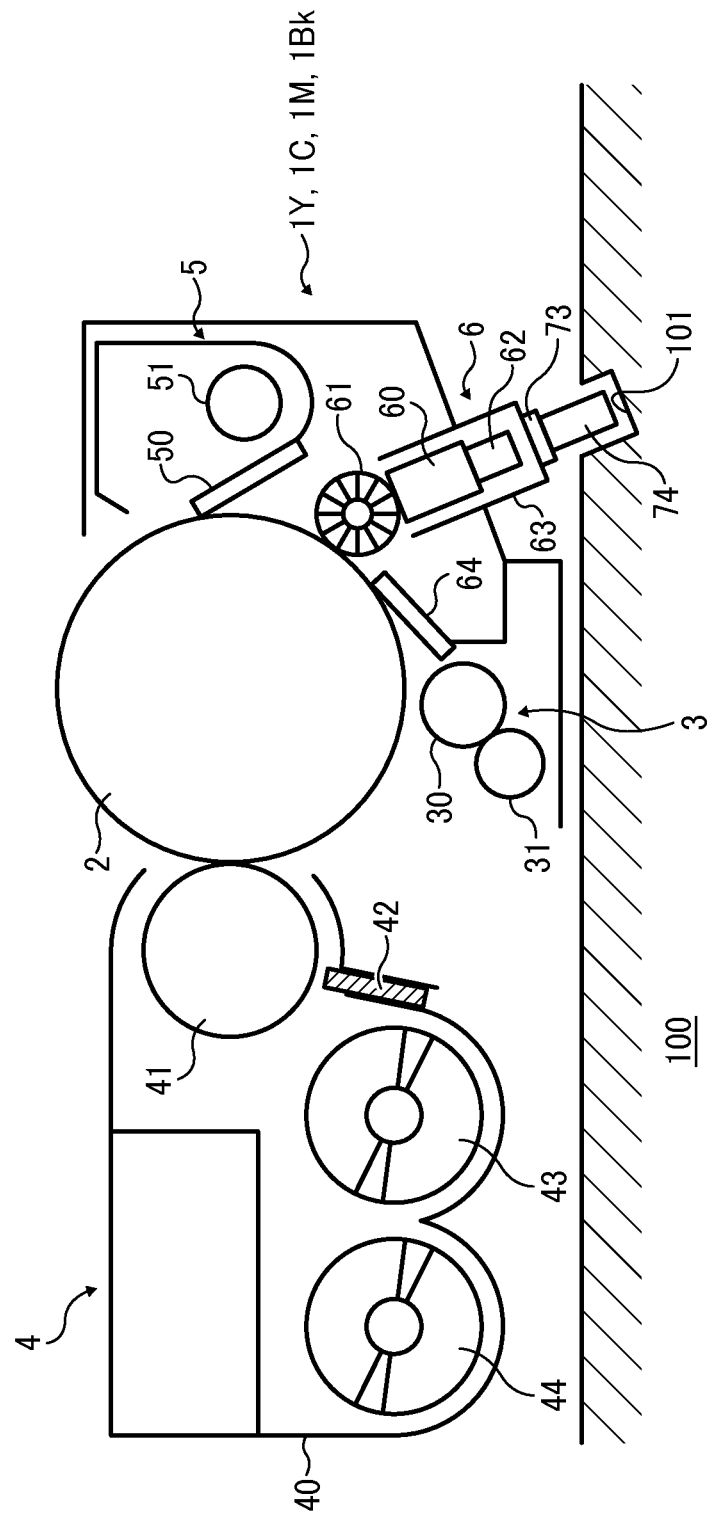
FIG. 12B is an end-on axial view of the process unit shown in FIG. 12B installed into a proper apparatus provided with a recess to receive the interference portion.

By contrast, as shown in FIG. 12B, by forming a recess 101 to avoid the interference projection 74 can be formed at the proper installation portion. This configuration enables installation of the lubricant supply device 6 or the process unit 1 in the proper installation portion.

It is to be noted that, in the configuration shown in FIG. 10, the switching member 71 is retained with the end thereof (on the right in FIG. 10) protruding to the outside from the opening 72. The protruding end of the switching member 71 is preferably contained inside the case 63 if the protruding end increases the installation space of the process unit 1 or there is the risk of interference between the protruding end and another process unit 1 or the like. In the configuration shown in FIG. 10, however, it is difficult to dispose the end of the switching member 71 inside the case 63 since the end of the switching member 71 interferes with the outer circumference of the spring 66 on the right in FIG. 10.

Specifically, referring to FIGS. 13A and 13B, the switching member 71 includes a portion 71g disposed facing the outer circumference of the spring 66, that is, the portion 71g that may interfere with the spring 66 (hereinafter "opposed portion 71g"). To avoid the interference, the opposed portion 71g may be deformed to conform to the outer circumferential shape of the spring 66. FIG. 13B illustrates the switching member 71 and the spring 66 as viewed in the direction indicated by arrow Z shown in FIG. 13A. In this case, as shown in FIG. 13B, the switching member 71 is bent so that the opposed portion 71g is oblique to the rest of the switching member 71, conforming to the outer circumference of the spring 66. With this configuration, the switching member 71 can be held inside the case 63. Accordingly, interference with another component can be avoided, and installation space can become compact. It is to be noted that the angle at which the switching member 71 is bent can be determined in accordance with the outer diameter of the spring 66.

Figure 14A:
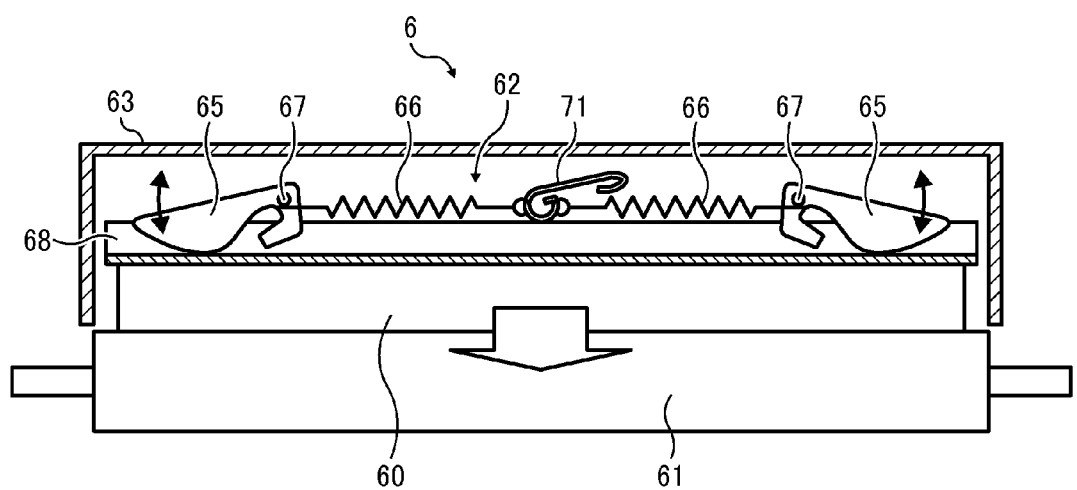
FIGS. 14A and 14B illustrate a lubricant supply device according to another variation.
Figure 14B:
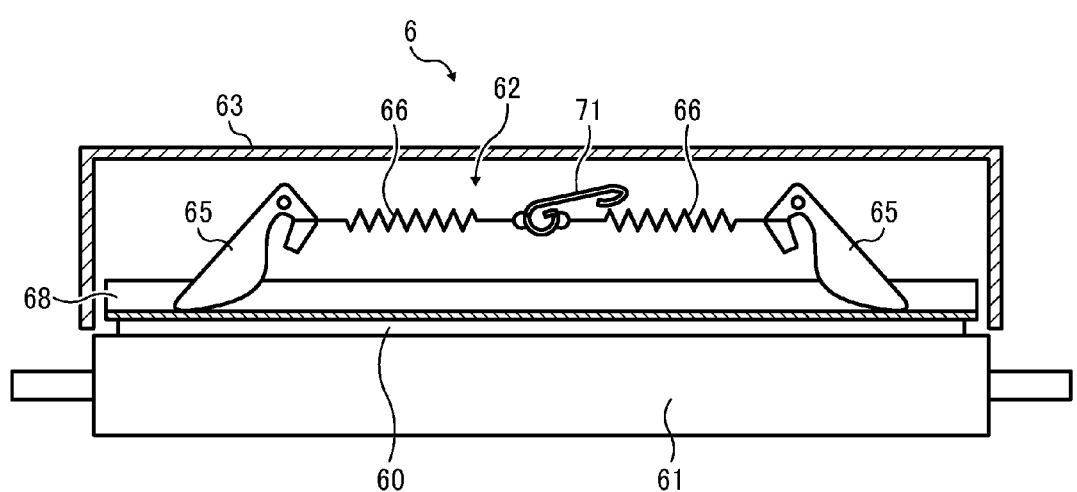

FIGS. 14A and 14B illustrate a lubricant supply device according to a variation.

The configuration shown in FIGS. 14A and 14B is different from that shown in FIGS. 3A and 3B in that the support shafts 67 to support the respective arms 65 are provided to not the lubricant holder 68 but the case 63. Here, a face of the lubricant holder 68 holding the solid lubricant 60 is referred to as "first face", and the opposite face of the lubricant holder 68 is referred to as "second face". As one end of the arm 65 is pulled to the side of the spring 66 by the bias force of the spring 66, the other end of the arm 65 contacts and presses the second face of the lubricant holder 68 opposite the first face holding the solid lubricant 60. Other than that, the configuration shown in FIGS. 14A and 14B is similar to that shown in FIGS. 3A and 3B. In the lubricant supply device 6 shown in FIGS. 14A and 14B as well, the pressing force can be changed easily by providing the switching member 71 between the pair of springs 66 and switching the posture of the switching member 71.

Figure 15:
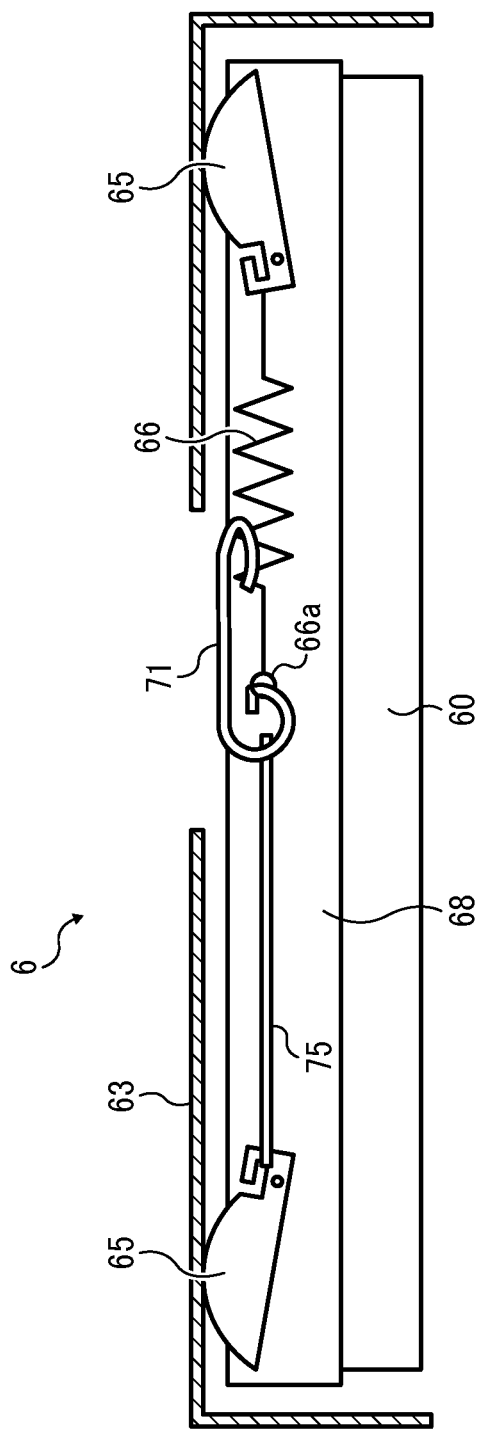
FIG. 15 illustrates a lubricant supply device employing a single spring as another variation.

Additionally, as shown in FIG. 15, the above-described aspects of the present invention can adapt to a configuration employing a single spring 66. Specifically, in the configuration shown in FIG. 15, a long supporter 75 is used instead of the other spring 66. In this case, the arms 65 are connected together by the long supporter 75, the spring 66, and the switching member 71 interposed therebetween, thereby enabling the bias force (pulling force) exerted by the single spring 66 to pull the two arms 65 and apply pressing force to the solid lubricant 60. Thus, the supporter to support the end 66a of the spring 66 opposite its end hooked on the arm 65 can be a member (i.e., long supporter 75) that does not applies bias force. In this configuration, similarly the pressing force can be reduced easily by switching the posture of the switching member 71. This configuration is advantageous particularly in reducing variations in bias force since bias force tolerances of the springs 66 are not piled up.

As described above, in the first embodiment and the variations thereof, the pressing force pressing the solid lubricant 60 to the supply roller 61 (i.e., lubricant supply member) can be changed easily changing the posture of the switching member 71, 71-1, or 71-2 serving as the pressing force adjuster in accordance with differences in configuration (rotational velocity of the supply roller 61, the charge type of the image forming unit, or the like).

[Second Embodiment]

Figure 16A:
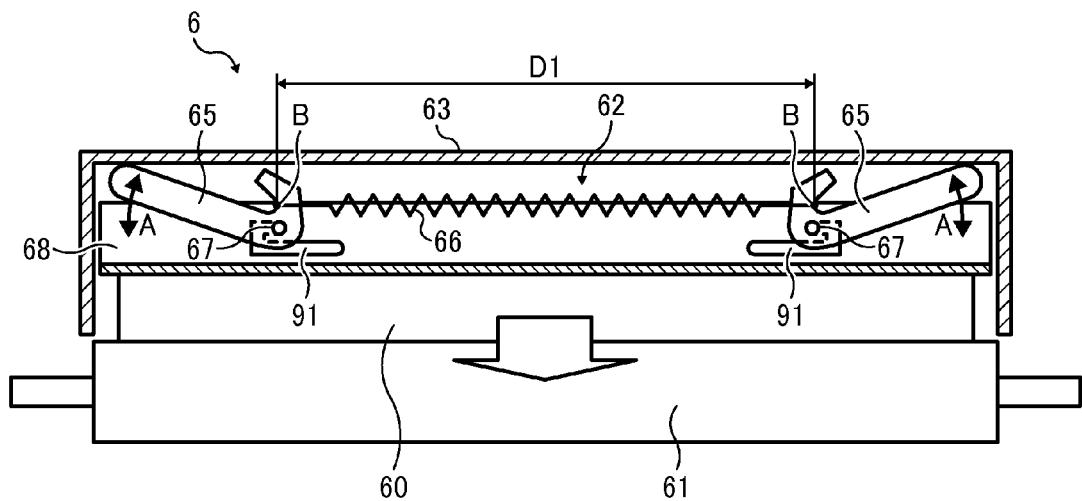
FIGS. 16A and 16B are front views of a lubricant supply device according to second embodiment, as viewed in the direction perpendicular to both the longitudinal direction of the solid lubricant and the direction in which the lubricant is pressed to the supply roller.
Figure 16B:
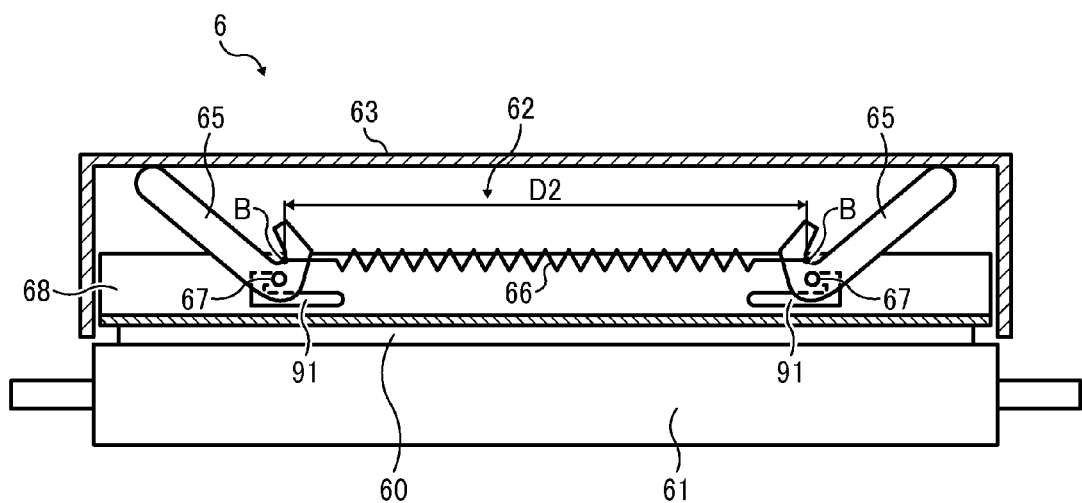

FIGS. 16A and 16B are schematic views of a lubricant supply device according to a second embodiment.

It is to be noted that, as described above with reference to FIGS. 3A and 3B, in FIGS. 16A and 16B, reference character B represents the hooked positions B, where the springs 66 are hooked on the respective arms 65, and reference characters D1 and D2 represent the distance between the hooked positions B.

In the lubricant supply device 6 shown in FIGS. 16A and 16B, two grooves 91 are formed as the pressing force adjuster to change the pressing force exerted by the pressing member 62. The two grooves 91 are symmetrical to each other with respect to a center of the lubricant holder 68 in the longitudinal direction thereof. The support shafts 67 of the arms 65 are inserted into the respective grooves 91.

Figure 17A:
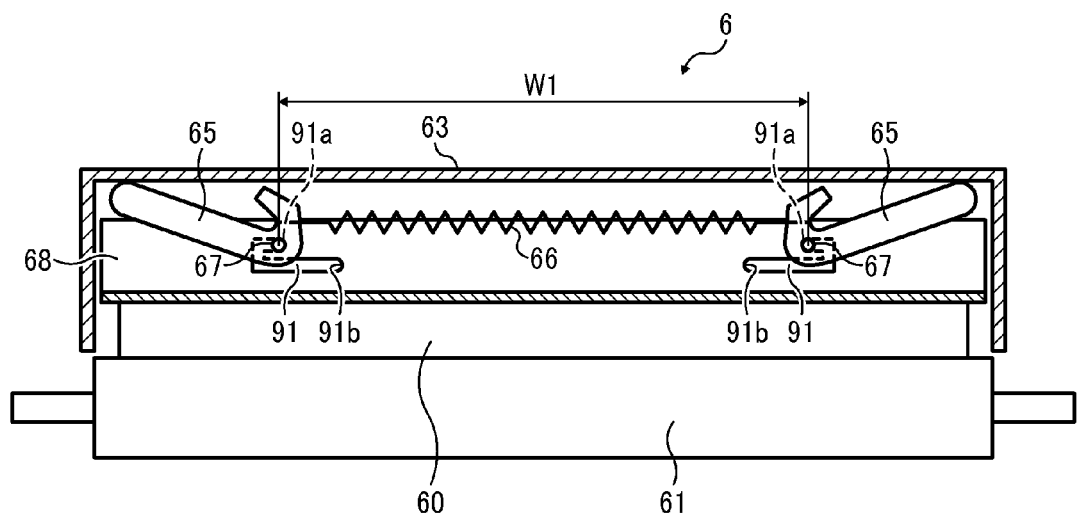
FIG. 17A illustrates a state in which a support shaft is retained at one of retaining portions of a groove serving as a pressing force adjuster according to the second embodiment.
Figure 17B:
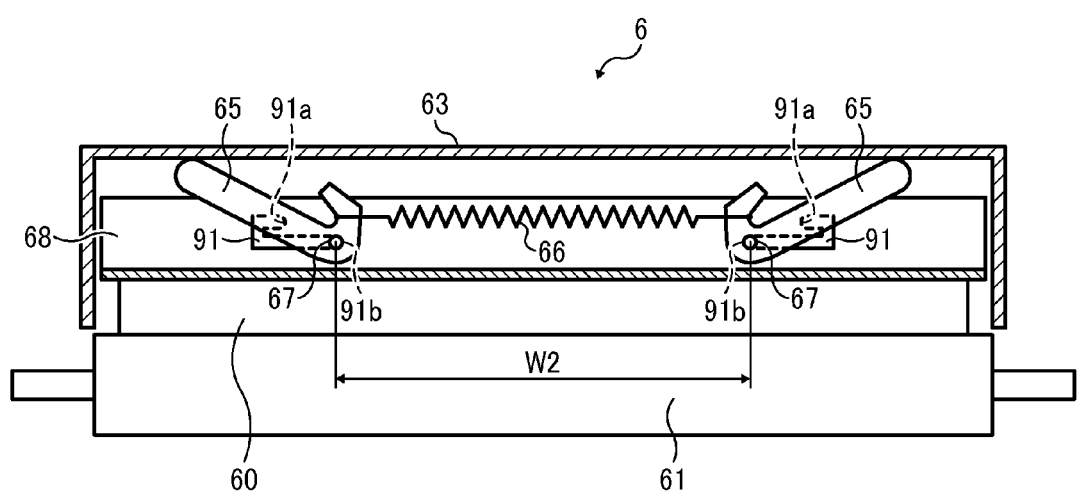
FIG. 17B illustrates a state in which the support shaft is retained at the other retaining portion.

The support shaft 67 is movable along the groove 91 between a first position (shown in FIG. 17A) retained at a first end 91a of the groove 91 and a second position (shown in FIG. 17B) retained at a second end 91b of the groove 91.

Figure 18:
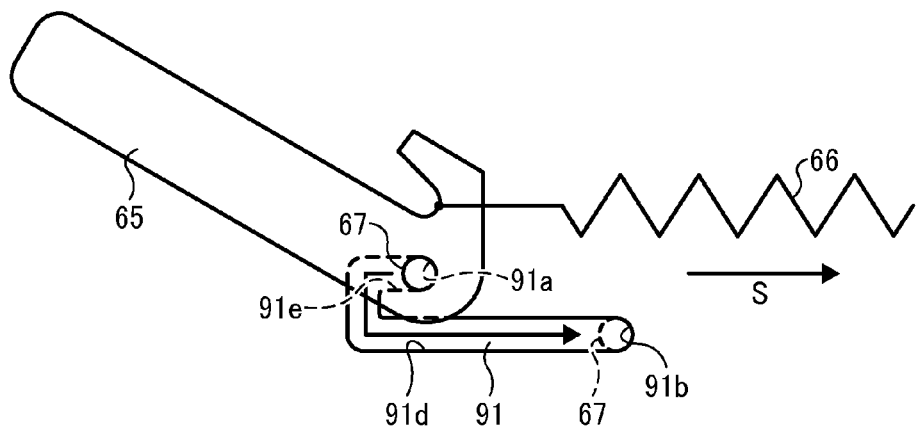
FIG. 18 is a schematic view illustrating a shape of the groove according to the second embodiment.

As shown in FIG. 18, the groove 91 has a bent shape. Specifically, the groove 91 extends from the first end 91a (upper end in FIG. 18) in the direction opposite the direction indicated by arrow S, in which the spring 66 pulls the arm 65 (hereinafter "bias direction S"). Then, the groove 91 is bent into the direction (downward in FIG. 18) perpendicular to the bias direction 5, bent again into the bias direction 5, and extends in the bias direction S to the second end 91b (on the lower side in FIG. 18).

In the groove 91, the first and second ends 91a and 91b respectively serve as first and second retaining portions (hereinafter also "first and second retaining portions 91a and 91b") to retain the support shaft 67 against the bias force exerted by the spring 66. Between the first and second retaining portions 91a and 91b, a guide portion 91d to guide the support shaft 67 extends. Thus, the groove 91 forms the multiple retaining portions 91a and 91b and the guide portion 91d.

It is to be noted that the shape of the groove 91 is not limited to the specific shape shown in those drawings.

Figure 19A:
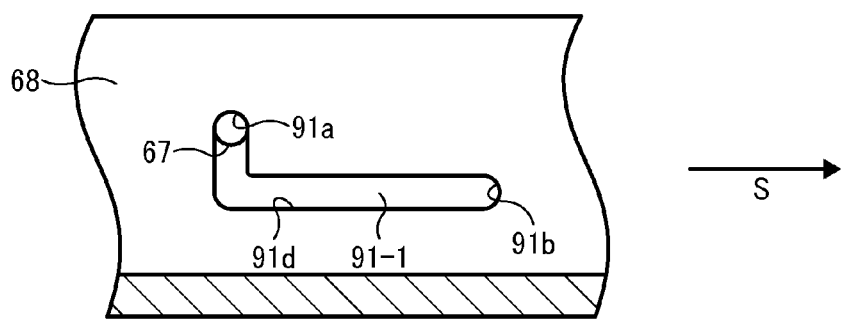
FIGS. 19A and 19B illustrate variations of the groove, respectively.
Figure 19B:
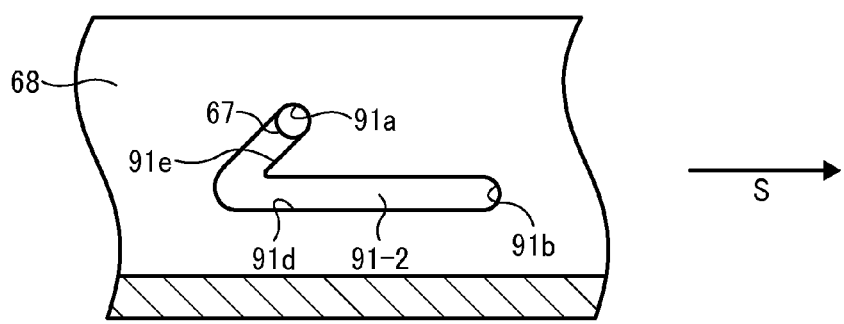

For example, FIG. 19A illustrates a groove 91-1 that is bent from the second retaining portion 91b toward the first retaining portion 91a into the direction substantially perpendicular to the bias direction S of the spring 66. Alternatively, FIG. 19B illustrates a groove 91-2 that is bent from the second retaining portion 91b toward the first retaining portion 91a in a direction crossing the bias direction S of the spring 66 and oblique to the bias direction S. The configurations shown in FIGS. 18 and 19B are advantageous particularly in inhibiting unintended movement of the support shaft 67 since these configurations include a restricting portion 91e to guide the support shaft 67 in the direction opposite the bias direction S when the support shaft 67 moves from the first retaining portion 91a to the second retaining portion 91b.

The first and second retaining portions 91a and 91b are formed at different positions from each other in the bias direction S of the spring 66. In other words, the first and second retaining portions 91a and 91b retain the arm 65 (the support shaft 67 in particular), which supports the end of the spring 66, at different positions in the bias direction S.

With this configuration, the distance (distance W1 shown in FIG. 17A and distance W2 shown in FIG. 17B) between the two support shafts 67 defers depending on the portions (either the first retaining portions 91a or the second retaining portions 91b) where the support shafts 67 are retained. In this configuration, the distance W2 (shown in FIG. 17B) between the support shafts 67 being retained at the second retaining portions 91b is smaller than the distance W1 (shown in FIG. 17A) between the support shafts 67 being retained at the first retaining portions 91a.

In the state (shown in FIG. 17A) in which the support shafts 67 are held by the first retaining portions 91a, the distance W1 is greater and the spring 66 is pulled with a stronger force. In this state, the spring 66 exerts an increased pulling force, thus giving an increased bias force to the arms 65. Accordingly, the pressing force pressing the solid lubricant 60 to the supply roller 61 is kept at a greater force.

By contrast, in the state (shown in FIG. 17B) in which the support shafts 67 are held by the second retaining portions 91b, the distance therebetween is reduced and tension of the pulled spring 66 is loosened. Consequently, the bias force given to the arms 65 is weakened, and the strength of pressing force with which the solid lubricant 60 is pressed to the supply roller 61 is weakened accordingly. Thus, the pressing force can be reduced easily by switching the positions where the respective support shafts 67 are held from the first retaining portions 91a to the second retaining portions 91b.

The support shafts 67 can be preliminarily held by common retaining portions (either the first retaining portions 91a or the second retaining portions 91b) in all process units 1 in manufacturing, thereby setting the pressing force identical in all process units 1, regardless of differences in configurations. After the lubricant supply devices 6 is assembled in the process units 1, or at a final manufacturing process, in the second embodiment shown in FIGS. 16A to 18, the position of the support shaft 67 is changed from one of the first and second retaining portions 91a and 91b to the other as required.

As described above, according to the second embodiment and variations thereof, in the lubricant supply device 6 that includes the lubricant supply member (i.e., supply roller 61) to supply lubricant to a lubrication target and the elastic member (i.e., spring 66) to exert bias force for pressing the solid lubricant 60 to the lubricant supply member, the supporter (i.e., support shaft 67) to support the end of the elastic member is movable in the biasing direction of the elastic member, and the multiple retaining portions (i.e., first and second retaining portions 91a and 91b) are provided at different positions in the biasing direction to retain the supporter at different positions. The first and second retaining portions 91a and 91b serve as the pressing force adjuster with which the pressing force can be changed easily.

Specifically, in the second embodiment, the pressing force can be changed easily by changing the position of the support shaft 67, serving as the supporter to support the end of the spring 66 (i.e., elastic member) between the first and second retaining portions 91a and 91b of the groove 91.

The support shaft 67 is preliminarily disposed in either first or second retaining portions 91a and 91b commonly in all process units 1 in manufacturing, thereby setting the pressing force identical in all process units 1 regardless of differences in configurations, and the position of the support shaft 67 is changed along the groove 91 as required later in accordance with differences in configuration (rotational velocity of the supply roller 61, the charge type of the image forming unit, or the like).

Thus, the second embodiment also concerns a method of manufacturing a process unit that is removably installed in an apparatus body of an image forming apparatus. The process unit includes a photoreceptor serving as a lubrication target and the lubricant supply device provided with the elastic member to exert bias force for pressing the solid lubricant to the lubricant supply member. The method includes the following steps of: in assembling of the lubricant supply device, the supporter to support the end of the elastic member is retained at one of multiple retaining portions provided at different positions in the biasing direction of the elastic member; and after the lubricant supply device is assembled, the supporter is moved to another retaining portion as required.

It is preferred that the position of the support shaft 67 can be changed externally after the process unit 1 is assembled. For example, in a configuration in which the case 63 (shown in FIGS. 17A and 17B) of the lubricant supply device 6 is removable from the outside, the support shaft 67 can be moved externally after assembling of the process unit 1 is completed. With this configuration, the pressing force can be changed easily at markets or user sites.

Figure 20:
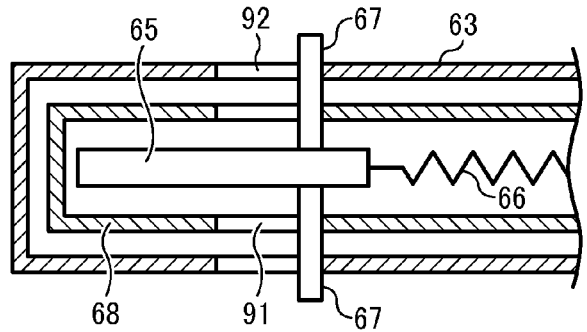
FIG. 20 is a cross sectional view of an interior of a case exposed by cutting the case along the longitudinal direction thereof, as viewed from above.

Additionally, as shown in FIG. 20, an opening 92 may be formed in the case 63 to expose the support shaft 67. It is to be noted that FIG. 20 is a cross sectional view of the interior of the case 63 exposed by cutting the case 63 along the longitudinal direction thereof, as viewed from above. This configuration can eliminate the necessity of removal of the case 63 to move the support shaft 67 along the groove 91 and thus further facilitate the adjustment of the pressing force.

Figure 21:
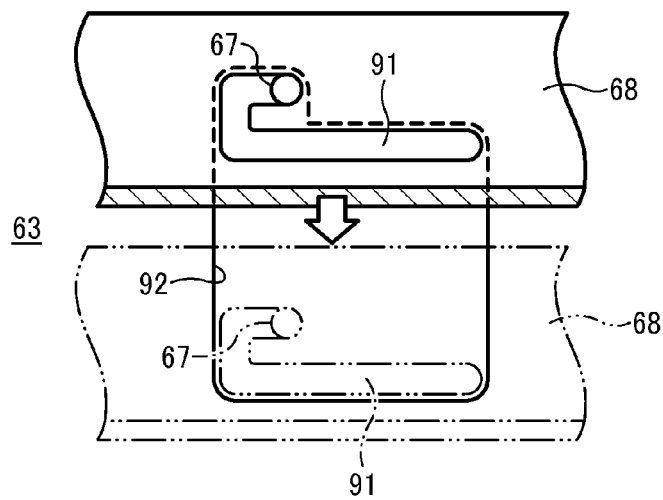
FIG. 21 is a schematic view illustrating a shape of an opening formed in the case in the second embodiment.

In this case, additionally, as shown in FIG. 21, the opening 92 formed in the case 63 has an opening area greater than that of the groove 91 so that the support shaft 67 can be moved along the groove 91 even when the lubricant holder 68 moves as the solid lubricant 60 is consumed.

Figure 22:
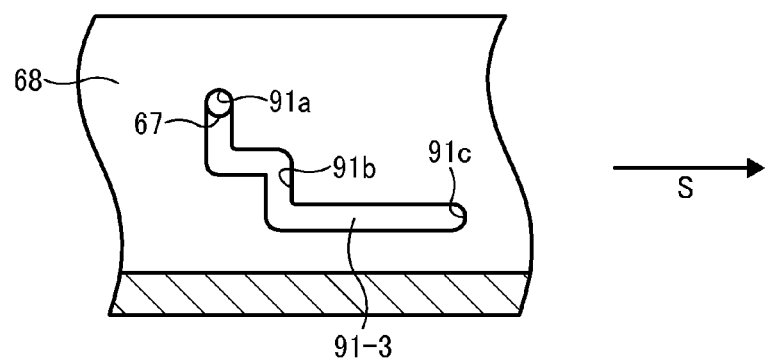
FIG. 22 illustrates a groove including three retaining portions, according to a variation of the second embodiment.

Further, the groove 91 may be modified into a stepwise shape such that three or more retaining portions are formed at different positions in the bias direction S of the spring 66. For example, FIG. 22 illustrates a groove 91-3 that includes first, second, and third retaining portions 91a, 91b, and 91c. This configuration enables stepwise adjustment of the pressing force.

Figure 23A:
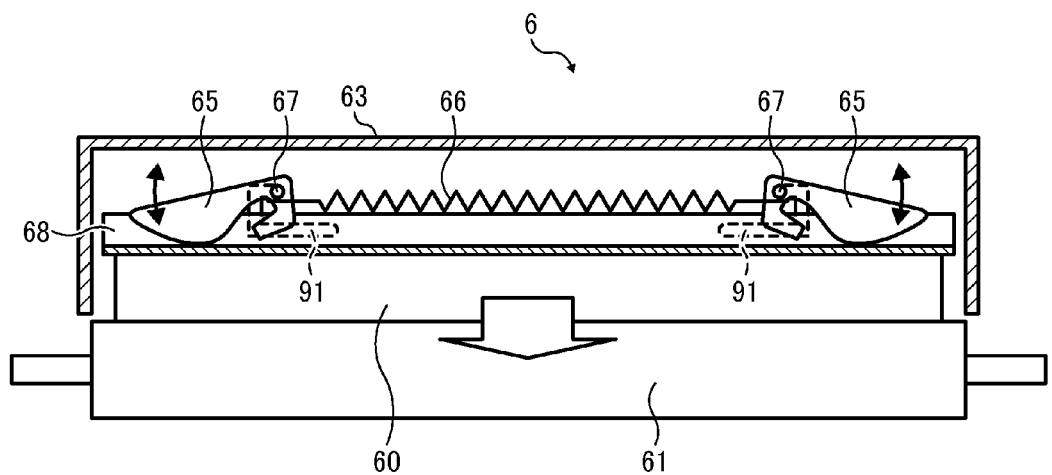
FIGS. 23A and 23B illustrate a lubricant supply device according to another variation.
Figure 23B:
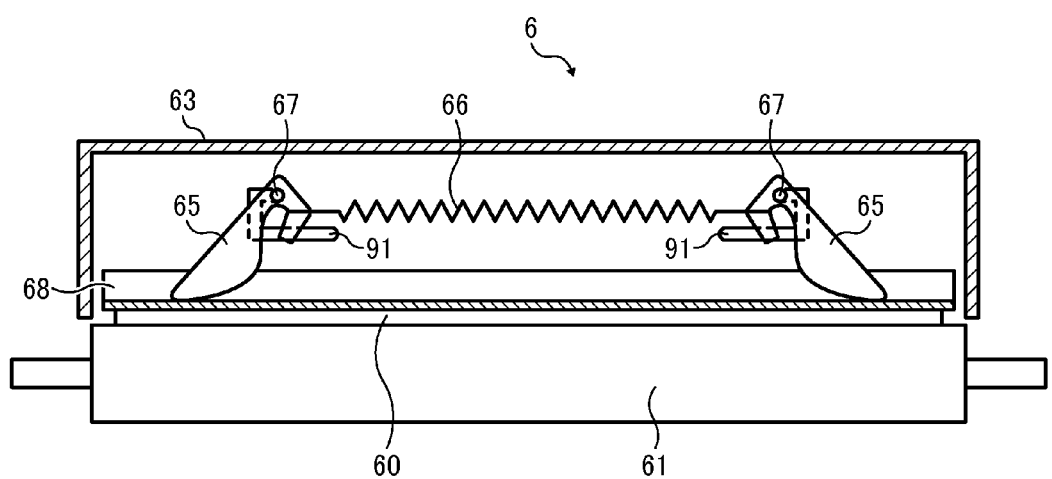

FIGS. 23A and 23B illustrate a variation of the lubricant supply device 6 according to the second embodiment, shown in FIGS. 16A to 18.

The configuration shown in FIGS. 23A and 23B is different from that shown in FIGS. 16A to 18 in that the grooves 91 to support the respective support shafts 67 are formed in not the lubricant holder 68 but the case 63. In the configuration shown in these drawings, as one end of the arm 65 is pulled to the side of the spring 66 by the bias force of the spring 66, the other end of the arm 65 contacts and presses the second face of the lubricant holder 68 opposite the first face of the lubricant holder 68 that holds the solid lubricant 60. Other than that, the configuration shown in FIGS. 23A and 23B is similar to that shown in FIGS. 16A and 16B. In the lubricant supply device 6 shown in FIGS. 23A and 23B as well, the pressing force can be changed easily by moving the support shafts 67 along the respective grooves 91.

Figure 24:
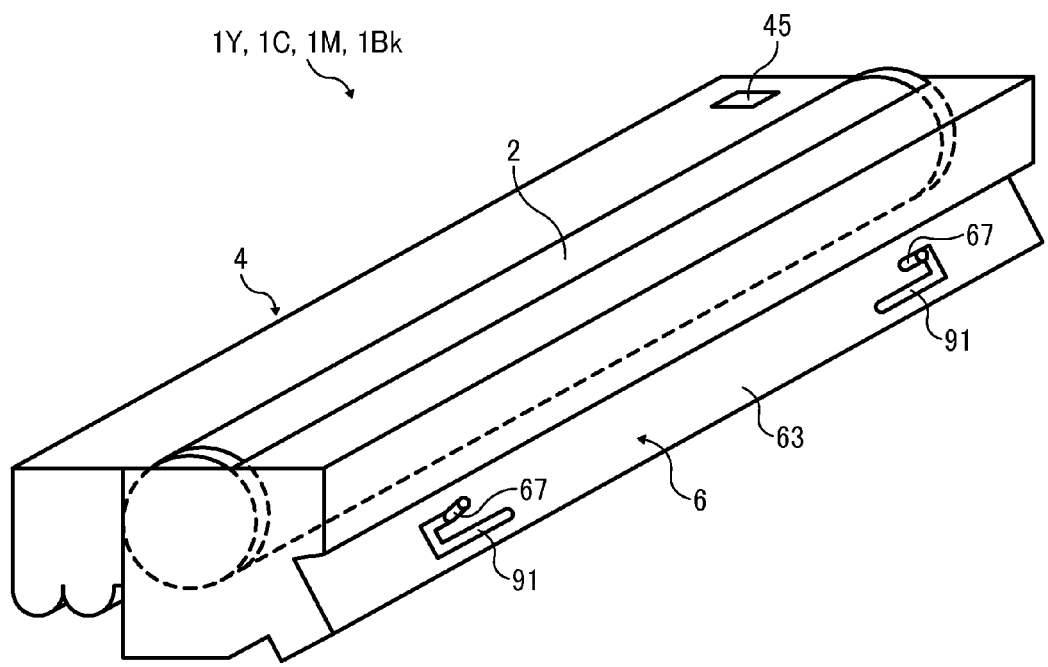
FIG. 24 is a perspective view illustrating an exterior of the lubricant supply device shown in FIGS. 23A and 23B.

Further, as shown in FIG. 24, exposing the support shafts 67 through the grooves 91 formed in the case 63 is advantageous since this configuration provides access to the support shafts 67 from the outside of the case 63 to move the support shafts 67. Additionally, as in the configuration shown in FIG. 24, when the grooves 91 are formed at positions where the support shafts 67 are easily viewed or accessed from above, the operability can improve since it is not necessary to tilt or turn upside down the process unit 1 to operate the support shafts 67. For example, in FIG. 24, the grooves 91 are formed in a side face of the case 63 facing up obliquely. This configuration is particularly advantageous in preventing leak of toner when an upper force of the process unit 1 includes a supply inlet 45 through which toner is supplied into the developing device 4.

As described above, according to the second embodiment, the pressing force pressing the solid lubricant to the lubricant supply member (such as the supply roller 61) can be changed easily using the pressing force adjuster constructed of the support shafts 67 and the first and second retaining portions 91a and 91b of the grooves 91 to retain the support shaft 67. The pressing force can be changed by moving, from one retaining portion to another retaining portion, the arms 65 serving as the supporter to support the spring 66 (elastic member) in accordance with differences in configuration.

[Third Embodiment]

Figure 25A:
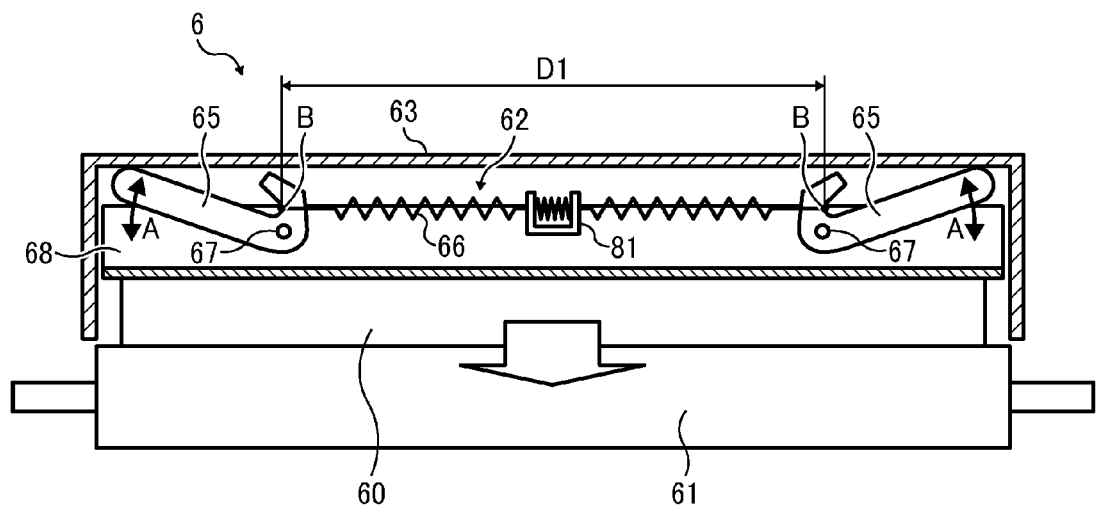
FIGS. 25A and 25B are front views of a lubricant supply device according to a third embodiment, as viewed in the direction perpendicular to both the longitudinal direction of the solid lubricant and the direction in which the lubricant is pressed to the supply roller.
Figure 25B:
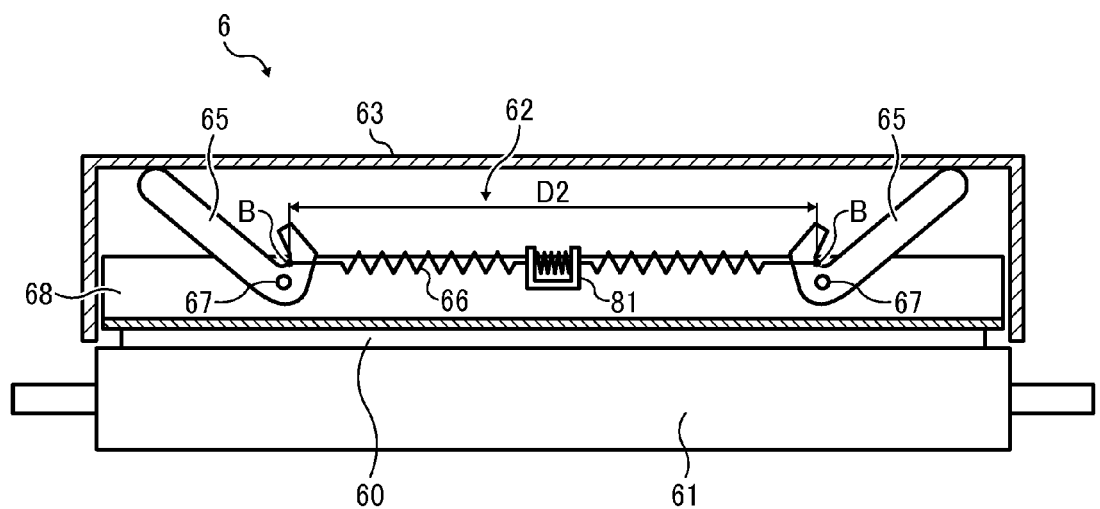

FIGS. 25A and 25B are schematic views of a lubricant supply device according to a third embodiment.

It is to be noted that, as described above with reference to FIGS. 3A and 3B, in FIGS. 25A and 25B, reference character B represents the hooked positions B, where the springs 66 are hooked on the respective arms 65, and reference characters D1 and D2 represent the distance between the hooked positions B.

The lubricant supply device 6 shown in FIGS. 25A and 25B includes a restrainer 81 as the pressing force adjuster to change the pressing force exerted by the pressing member 62.

Figure 26A:
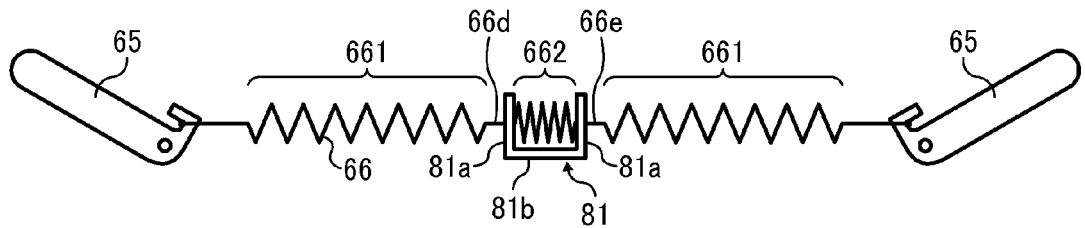
FIG. 26A illustrates a state in which a restrainer according to the third embodiment is attached.

The restrainer 81 can be removably attached to the spring 66 serving as the elastic member. FIG. 26A illustrates a state in which the restrainer 81 is attached to the spring 66, and FIG. 26B illustrates a state in which the restrainer 81 is removed from the spring 66.

Being attached to the spring 66, the restrainer 81 restrains the spring 66 with the amount of elastic deformation of the spring 66 different from that in a state in which the spring 66 is not restrained by the restrainer 81. Specifically, as shown in FIG. 26A, the restrainer 81 being attached to the spring 66 restrains the spring 66 with an intermediate portion 662 of the spring 66 compressed. Contrary to the compressed intermediate portion 662, both end portions 661 of the spring 66 are pulled further and retained in this state. That is, the restrainer 81 restrains the end portions 661 in a further pulled state.

Figure 26B:
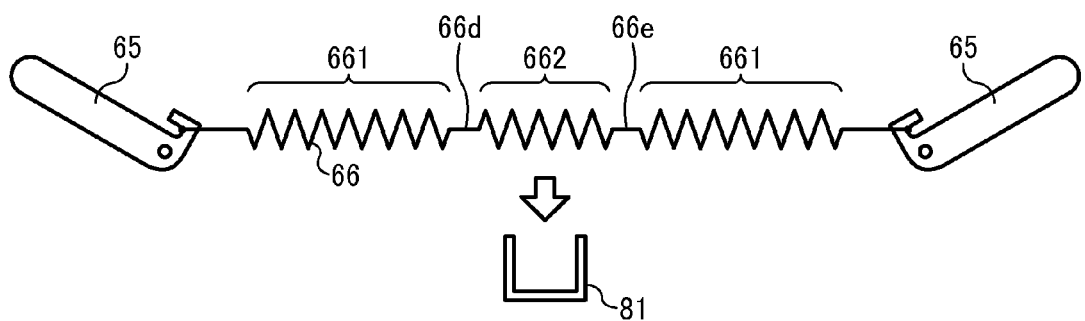
FIG. 26B illustrates a state in which the restrainer is removed.

Additionally, as shown in FIG. 26B, when the restrainer 81 is removed therefrom, the compression of the intermediate portion 662 is canceled. Accordingly, the tension of the end portions 661 is loosened.

Figure 27:
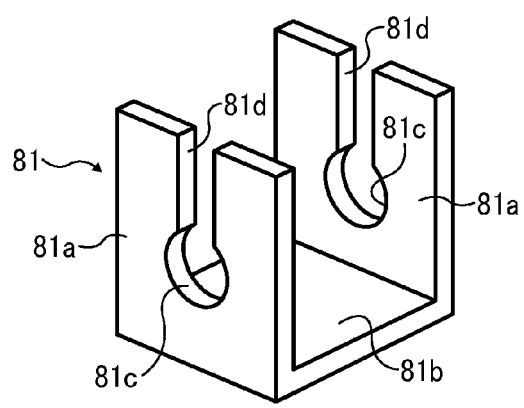
FIG. 27 is a perspective view illustrating an exterior of the restrainer shown in FIGS. 26A and 26B.

Referring to FIG. 27, the restrainer 81 includes a pair of restraining portions 81a and a connecting portion 81b connecting together the restraining portions 81a. The restraining portions 81a are parallel to each other and at a predetermined distance from each other. The connecting portion 81b is substantially perpendicular to the restraining portions 81a and connects ends thereof on the same side (in FIG. 27, the lower side). Additionally, a retaining hole 81c is formed in each restraining portion 81a. The spring 66 is inserted into the retaining holes 81c and retained thereby. Additionally, a slot 81d is formed in each restraining portion 81a. The slot 81d extends from the retaining hole 81c to the end (in FIG. 27, the upper end) of the restraining portion 81a opposite the end thereof connected to the connecting portion 81b. The spring 66 can be inserted via the slot 81d into the retaining hole 81c and removed therefrom.

The restrainer 81 can be attached to the spring 66 as follows. Compress the intermediate portion 662 of the spring 66 with, for example, fingers, sandwich the both sides of the compressed intermediate portion 662 by the restraining portions 81a, and attach the restrainer 81 to the spring 66 in this state. Thus, both ends of the intermediate portion 662 are restrained by the restraining portions 81a, thereby keeping the intermediate portion 662 compressed.

The spring 66 according to the third embodiment further includes straight portions 66d and 66e (shown in FIGS. 26A and 26B) that are not coiled, respectively disposed between the intermediate portion 662 and one of the end portions 661.

The restraining portions 81*a* are attached to the straight portions 66*d* and 66*e*, respectively. Since the intermediate portion 662 and the end portions 661 are thus separated via the straight portions 66*d* and 66*e*, the positions where the restraining portions 81*a* are attached can be clear, thus facilitating attachment of the restraining portions 81*a* to the proper positions.

As shown in FIG. 26A, in a state in which the restrainer 81 is attached to the spring 66, the intermediate portion 662 thereof is compressed. On the contrary, the end portions 661 of the spring 66 are pulled further and retained in this state. Thus, in the state in which the restrainer 81 is attached to the spring 66, the end portions 661 are pulled further, thereby increasing the amount of pulling force and bias force given to the arms 65 from the amounts of those forces in the state without the restrainer 81. Consequently, with the restrainer 81 being attached to the spring 66, the pressing force pressing the solid lubricant 60 to the supply roller 61 is kept at a greater force from that in the state without the restrainer 81.

By contrast, as shown in FIG. 26B, when the restrainer 81 is removed therefrom, the compression of the intermediate portion 662 is canceled, and the tension of the end portions 661 is loosened accordingly. Consequently, the bias force given to the arms 65 is weakened, and the strength of pressing force with which the solid lubricant 60 is pressed to the supply roller 61 is weakened accordingly. Thus, the pressing force can be reduced easily from the greater force to the smaller force by removing the restrainer 81.

In the third embodiment, for example, the restrainer 81 serving as the pressing force adjuster is preliminarily attached in all process units 1 in manufacturing, thereby setting the pressing force to the greater force in all process units 1, regardless of differences in configurations. After the lubricant supply devices 6 is assembled in the process units 1, or at a final manufacturing process, the restrainer 81 is removed as required to reduce the pressing force to the smaller force.

As described above, according to the third embodiment, in the lubricant supply device 6 that includes the lubricant supply member (i.e., supply roller 61) to supply lubricant to a lubrication target and the elastic member (i.e., spring 66) to exert bias force for pressing the solid lubricant 60 to the lubricant supply member, a restrainer (i.e., restrainer 81) is provided. The restrainer is removably attached to the elastic member to retain the elastic member with an amount of elastic deformation of the elastic member varied from the amount of elastic deformation in a state in which the restrainer is not attached to the elastic member.

The restrainer 81 serves as the pressing force adjuster. The pressing force pressing the solid lubricant 60 to the supply roller 61 can be changed easily by attaching the restrainer 81 to the spring 66 and removing the restrainer 81 therefrom.

For example, the restrainer 81 is preliminarily attached to the spring 66 commonly in all process units 1 in manufacturing, thereby setting the pressing force identical (i.e., greater force) in all process units 1 regardless of differences in configurations, and the restrainer 81 is removed as required later in accordance with differences in configuration (rotational velocity of the supply roller 61, the charge type of the image forming unit, or the like). Thus, the pressing force is reduced.

On the contrary, initially the lubricant supply device 6 may be assembled without the restrainer 81, and the restrainer 81 may be attached later as required.

Thus, the third embodiment also concerns a method of manufacturing the above-described process unit. The method includes the following steps of: in assembling of the lubricant supply device, the restrainer is attached to the elastic member to retain the elastic member with an amount of elastic deformation of the elastic member varied from the amount of elastic deformation in a state in which the restrainer is not attached to the elastic member; and, after the lubricant supply device is assembled, the restrainer is removed from the elastic member as required.

It is preferred that the restrainer 81 can be installed or removed externally after the process unit 1 is assembled. For example, in a configuration in which the case 63 (shown in FIGS. 25A and 25B) of the lubricant supply device 6 is removable from the outside, attachment or removal of the restrainer 81 can be done from the outside after assembling of the process unit 1 is completed.

Figure 28:
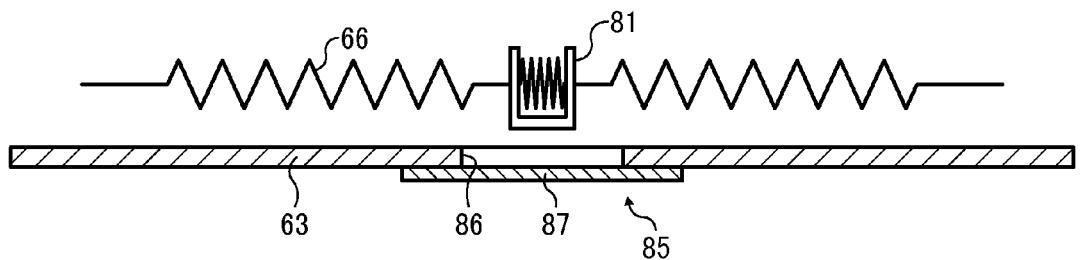
FIG. 28 illustrates a variation of the third embodiment, in which a window is provided to the case for checking the restrainer.

Additionally, as shown in FIG. 28, providing a window 85 in the case 63 for checking the restrainer 81 is advantageous since it is not necessary to remove the case 63 to check the presence or absence of the restrainer 81 from the outside. In the configuration shown in FIG. 28, for example, the window 85 is constructed of an opening 86 positioned corresponding to the position where the restrainer 81 is housed in the case 63 and a transparent seal 87 to cove the opening 86.

Figure 29:
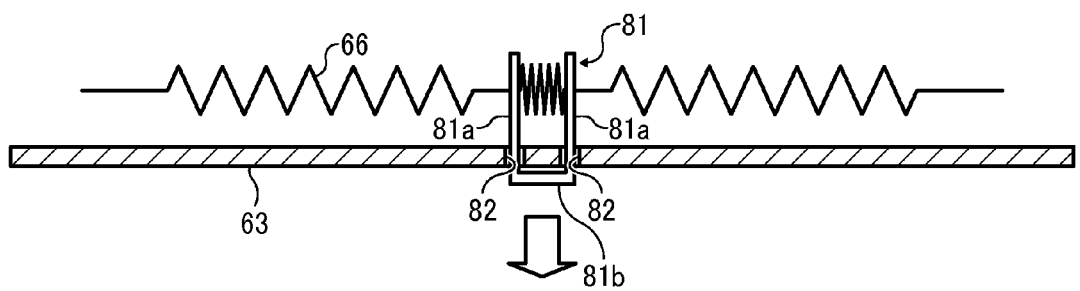
FIG. 29 illustrates another variation of the third embodiment, in which the restrainer is pertly exposed from the case.

Additionally, the restrainer 81 may be pertly exposed from the case 63 as shown in FIG. 29. This configuration can eliminate the necessity of removal of the case 63 to install or remove the restrainer 81 and thus further facilitate the attachment or removal. Specifically, in the configuration shown in FIG. 29, a through hole 82 into which the restraining portion 81*a* is inserted is formed to penetrate the case 63 from outside to the inside of the case 63. In the state in which the restrainer 81 is attached to the spring 66, the connecting portion 81*b* is exposed, and removal of the restrainer 81 can be possible from outside the case 63 by gripping the exposed connecting portion 81*b*.

Figure 30:
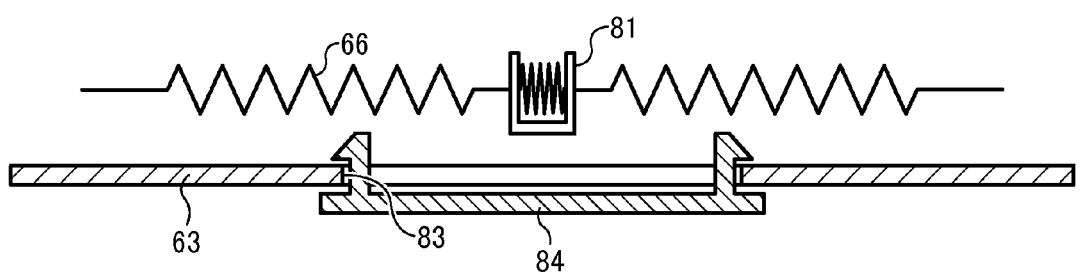
FIG. 30 illustrates a configuration in which an opening is formed in the case to enable attachment and removal of the restrainer from outside.

Additionally, as shown in FIG. 30, an opening 83 may be formed in the case 63 at the position where the restrainer 81 is housed so that the restrainer 81 can be accessed from the outside for attachment and removal thereof. Further, in the configuration shown in FIG. 30, a lid 84 to close the opening 83 is provided to inhibit scattering of lubricant and toner therefrom. In this configuration, access from outside the case 63 to the restrainer 81 for removal is available when the lid 84 is removed from the case 63. When the lid 84 is formed with a transparent material, the presence of the restrainer 81 can be visually checked from the outside in the state in which the lid 84 is closed.

Yet additionally, the restrainer 81 may be provided with an interference portion, such as an interference projection 88 shown in FIG. 31A, designed to interfere with the frame of the apparatus body 100 (at the position Q shown in FIG. 31A) when the wrong lubricant supply device 6 or the wrong process unit 1 is installed. FIG. 32 is cross-sectional view along line X-X shown in FIG. 31A. As shown in FIG. 32, in this case, the interference projection 88 is provided to a portion of the restrainer 81 exposed outside the case 63. This configuration can prevent installation of the wrong lubricant supply device 6 or the wrong process unit 1.

Figure 31B:
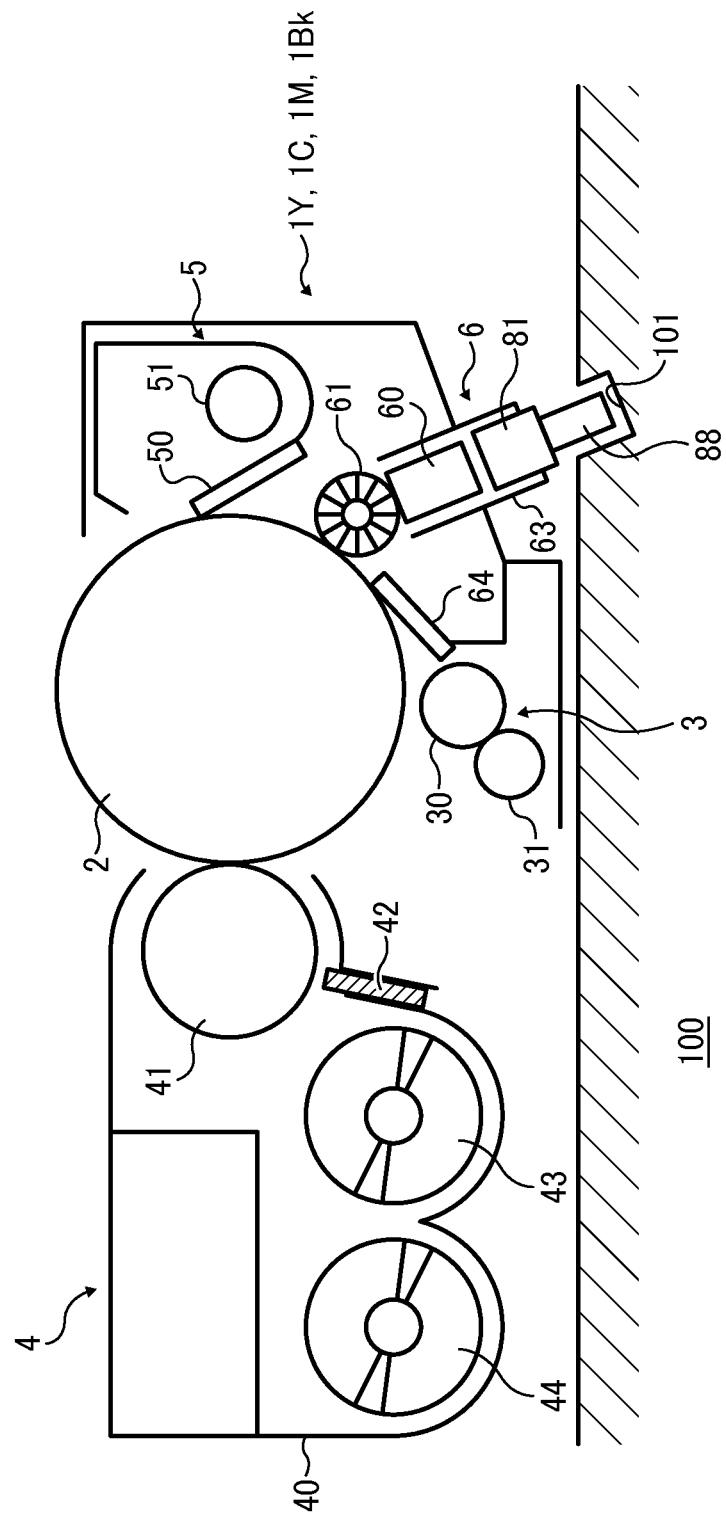
FIG. 31B is an end-on axial view of the process unit shown in FIG. 31B installed in a proper installation portion.
Figure 32:
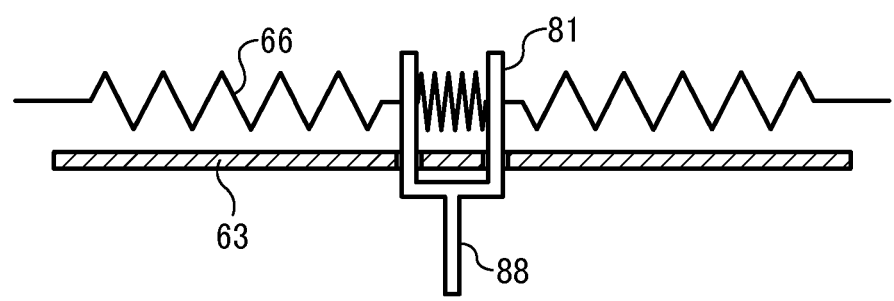
FIG. 32 is a cross-sectional view along line X-X shown in FIG. 31A.

By contrast, as shown in FIG. 31B, by forming the recess 101 to avoid the interference projection 88 can be formed at the proper installation portion. With this configuration, the lubricant supply device 6 or the process unit 1 can be installed in the proper installation portion.

Figure 33:
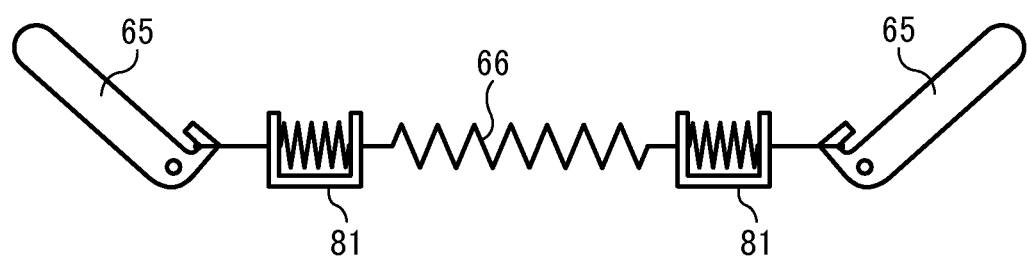
FIG. 33 is a schematic view illustrating a configuration as a variation of the third embodiment, in which multiple restrainers are attached to the spring.

Additionally, as shown in FIG. 33, multiple restrainers 81 may be attached to the spring 66. This configuration enables stepwise adjustment of the pressing force.

Figure 34A:
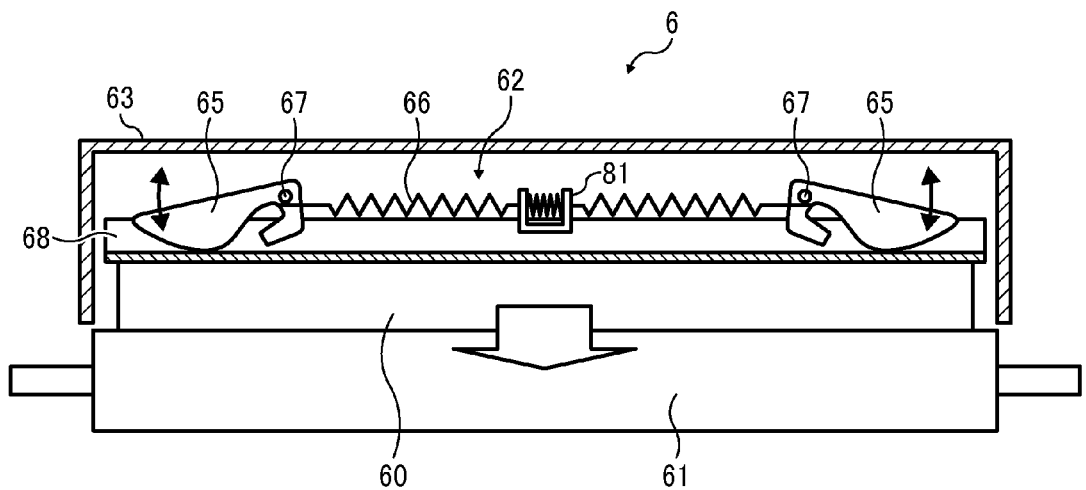
FIGS. 34A and 34B illustrate a lubricant supply device according to another variation of the third embodiment.
Figure 34B:
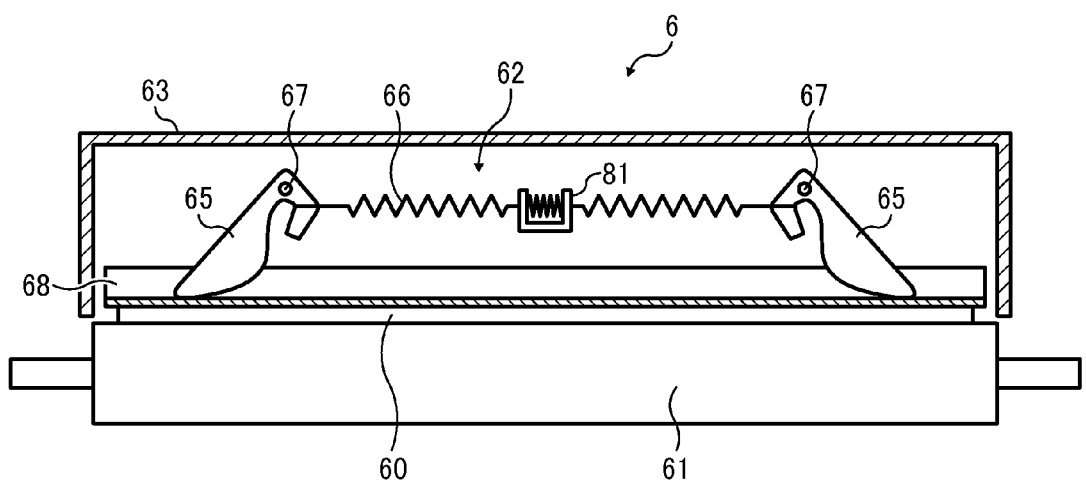

FIGS. 34A and 34B illustrate a lubricant supply device 6 as a variation of the third embodiment.

The configuration shown in FIGS. 34A and 34B is different from that shown in FIGS. 16A and 16B in that the support shafts 67 to support the respective arms 65 are provided to not the lubricant holder 68 but the case 63, which is similar to the configuration shown in FIGS. 14A and 14B. As described above with reference to FIGS. 14A and 14B, as one end of the arm 65 is pulled, the other end of the arm 65 contacts and presses the second face of the lubricant holder 68 opposite the first face holding the solid lubricant 60. Other than that, the configuration shown in FIGS. 34A and 34B is similar to that shown in FIGS. 16A and 16B. In the lubricant supply device 6 shown in FIGS. 34A and 34B as well, the pressing force can be changed easily by attaching the restrainer 81 to the spring 66 and removing the restrainer 81.

As described above, according to the third embodiment and the variations thereof, the pressing force pressing the solid lubricant to the lubricant supply member (such as the supply roller 61) can be changed easily by attaching and removing the restrainer 81, serving as the pressing force adjuster, to restrain the elastic member (such as the spring 66).

Thus, according to the above-described first, second, and third embodiments, the pressing force pressing the solid lubricant to the lubricant supply member (such as the supply roller 61) can be changed easily using the pressing force adjuster in accordance with differences in configuration (rotational velocity of the supply roller 61, the charge type of the image forming unit, or the like).

For example, in the first embodiment, the switching member 71 serves as the pressing force adjuster. In the second embodiment, the pressing force adjuster is constructed of the support shafts 67 and the first and second retaining portions 91a and 91b of the grooves 91 to retain the support shaft 67. In the third embodiment, the restrainer 81 serves as the pressing force adjuster.

This configuration can simplify adjustment of the pressing force, improving work efficiencies.

Additionally, according to the embodiments described above, components (such as springs) constructing the pressing member can be common among different machine types, thus obviating the necessity to manufacture a dedicated pressing member for each of different machine types or different image forming units. Accordingly, inventory management and assembling work can be simplified, and the cost can be reduced.

Although the descriptions above concern the lubricant supply device 6 to lubricate the surface of the photoreceptor 2, alternatively, the aspects of the present invention can adapt to lubricant supply devices to lubricate the surface of a belt such as an intermediate transfer belt. Moreover, image forming apparatus that can use the lubricant supply devices according to the above-described embodiments are not limited to the configuration shown in FIG. 1 but may be other type image forming apparatuses, namely, other type copiers, facsimile machines, or multifunction machines (so-called multifunction peripheral or MFP) having these capabilities.

In the description above, it will be understood that if an element or layer is referred to as being "on," "against," "connected to" or "coupled to" another element or layer, then it can be directly on, against, connected, or coupled to the other element or layer, or intervening elements or layers may be present. In contrast, if an element is referred to as being "directly on", "directly connected to" or "directly coupled to" another element or layer, then there are no intervening elements or layers present. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed above could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Numerous additional modifications and variations are possible in light of the above teachings. It is therefore to be understood that, within the scope of the appended claims, the disclosure of this patent specification may be practiced otherwise than as specifically described herein.

What is claimed is:

1. A lubricant supply device comprising:
a solid lubricant;
a lubricant holder to hold the solid lubricant;
a lubricant supply member to supply lubricant to a lubrication target;
a pressing member that presses against the lubricant holder to press the solid lubricant toward the lubricant supply member, the pressing member including at least one rotatably movable arm and an elastic member; and
a pressing force adjuster connected to the pressing member, the pressing force adjuster being configured to move from a first position to a second position relative to the pressing member.

2. The lubricant supply device according to claim 1, wherein the elastic member exerts elastic force to press the solid lubricant toward the lubricant supply member,
the pressing force adjuster comprises a switching member disposed between an end of the elastic member and a supporter to support the end of the elastic member, and
the switching member is switched between a first posture to connect together the end of the elastic member and the supporter with a distance therebetween reduced in a biasing direction of the elastic member, and a second posture to connect together the end of elastic member and the supporter with the distance therebetween increased in the biasing direction.

3. The lubricant supply device according to claim 2, wherein the elastic member comprises a tension spring,
   the switching member comprises first, second, and third hook portions,
   a distance between the second and third hook portions is greater than a distance between the first and second hook portions,
   the end of the tension spring and the supporter are respectively hooked on first and second hook portions when the switching member is in the first posture, and
   the end of the tension spring and the supporter are respectively hooked on the second and third hook portions when the switching member is in the second posture.

4. The lubricant supply device according to claim 3, wherein the first and second hook portions are curved portions continuous with each other, and the third hook portion is a curved portion continuous with the second hook portion and farther from the second hook portion than the distance between the first and second hook portions.

5. The lubricant supply device according to claim 4, wherein the second hook portion and one of the first and third hook portions follow an identical arc.

6. The lubricant supply device according to claim 2, further comprising a case to house the solid lubricant and the elastic member,
   wherein an opening is formed in the case to enable access to the switching member from outside the case to operate the switching member.

7. The lubricant supply device according to claim 2, wherein the switching member comprises an opposed portion disposed facing an outer circumference of the elastic member, and
   the opposed portion is shaped to conform to the outer circumference of the elastic member.

8. The lubricant supply device according to claim 2, wherein the supporter to support the end of the elastic member is movable in a biasing direction of the elastic member, and
   the pressing force adjuster includes multiple retaining portions disposed at different positions in the biasing direction to retain the supporter at different positions.

9. The lubricant supply device according to claim 8, wherein the pressing force adjuster further comprises a guide portion disposed between the multiple retaining portions to guide the supporter.

10. The lubricant supply device according to claim 9, wherein a groove is formed in the lubricant holder, and the groove forms the multiple retaining portions and the guide portion.

11. The lubricant supply device according to claim 9, further comprising a case to house the solid lubricant and the elastic member,
    wherein a groove is formed in the lubricant holder, and the groove forms the multiple retaining portions and the guide portion.

12. The lubricant supply device according to claim 11, wherein the supporter is partly exposed outside the case,
    the pressing member further includes an arm connected to the end of the elastic member, the arm pivotable about a support shaft to press the solid lubricant against the lubricant supply member by a bias force exerted by the elastic member, and
    the support shaft is movable along the groove.

13. The lubricant supply device according to claim 1, wherein the pressing force adjuster comprises a restrainer removably attached to the elastic member to retain the elastic member with an amount of elastic deformation of the elastic member varied from the amount of elastic deformation in a state in which the restrainer is not attached to the elastic member.

14. The lubricant supply device according to claim 13, wherein the restrainer comprises a pair of restraining portions to retain the elastic member in a compressed state and a connecting portion connecting together the restraining portions.

15. The lubricant supply device according to claim 13, further comprising a case to house the solid lubricant and the elastic member,
    wherein the restrainer is partly exposed from the case.

16. The lubricant supply device according to claim 13, further comprising a case to house the solid lubricant and the elastic member,
    wherein an opening is formed in the case to enable attachment and removal of the restrainer from outside the case, and
    a lid to close the opening is removably provided to the case.

17. A process unit removably mounted in an apparatus body of an image forming apparatus, the process unit comprising:
    a photoreceptor to be lubricated; and
    the lubricant supply device according to claim 1 to lubricate the photoreceptor.

18. An image forming apparatus comprising:
    a photoreceptor to be lubricated; and
    the lubricant supply device according to claim 1.

19. A method of manufacturing a process unit that includes a photoreceptor to be lubricated and a lubricant supply device provided with a pressing member, that includes at least one rotatably movable arm and an elastic member connected to the at least one rotatably movable arm at an end of the elastic member, to press a solid lubricant to a lubricant supply member, the method comprising:
    retaining the pressing member to exert a predetermined amount of bias force in assembling of the lubricant supply device; and
    changing the amount of bias force exerted by the pressing member as required after the lubricant supply device is assembled by adjusting a position of a pressing force adjuster from a first position to a second position relative to the pressing member.

20. The method according to claim 19, wherein
    the method further comprises:
    retaining the pressing force adjuster in one of a first posture to connect together the end of the elastic member and a supporter with a distance therebetween reduced in a biasing direction of the elastic member, and a second posture to connect together the end of elastic member and the supporter with the distance therebetween increased in the biasing direction; and
    switching the pressing force adjuster to the other posture as required after the lubricant supply devices is assembled.

* * * * *